US012770282B2

(12) United States Patent
Phan et al.

(10) Patent No.: US 12,770,282 B2
(45) Date of Patent: Oct. 20, 2026

(54) JOINT ANGLE DETERMINATION UNDER LIMITED VISIBILITY

(71) Applicant: Healthcare Outcomes Performance Company Limited, Altrincham (GB)

(72) Inventors: Huy Quoc Phan, Fleet (GB); Thomas Harte, London (GB); Axel Sylvan, London (GB)

(73) Assignee: Healthcare Outcomes Performance Company Limited, Altrincham (GB)

( * ) Notice: Subject to any disclaimer, the term of this patent is extended or adjusted under 35 U.S.C. 154(b) by 427 days.

(21) Appl. No.: 18/257,251

(22) PCT Filed: Dec. 16, 2021

(86) PCT No.: PCT/IB2021/000879

§ 371 (c)(1),
(2) Date: Dec. 8, 2023

(87) PCT Pub. No.: WO2022/136915

PCT Pub. Date: Jun. 30, 2022

(65) Prior Publication Data

US 2024/0046498 A1 Feb. 8, 2024

Related U.S. Application Data

(60) Provisional application No. 63/128,576, filed on Dec. 21, 2020.

(51) Int. Cl.

*G06T 7/60* (2017.01)
*G06V 10/77* (2022.01)
*G06V 10/82* (2022.01)

(52) U.S. Cl.

CPC ............ *G06T 7/60* (2013.01); *G06V 10/7715* (2022.01); *G06V 10/82* (2022.01); *G06T 2207/20221* (2013.01)

(58) Field of Classification Search

CPC ............. G06T 7/60; G06T 2207/20221; G06T 2207/20061; G06T 2207/20084;
(Continued)

(56) References Cited

U.S. PATENT DOCUMENTS 5,465,308 A 11/1995 Hutcheson et al.
8,296,247 B2 10/2012 Zhang et al.
(Continued)

FOREIGN PATENT DOCUMENTS

CN 111008583 A 4/2020
CN 111507182 A 8/2020
(Continued)

OTHER PUBLICATIONS

Borji et al., Salient Object Detection: A Survey. Computational Visual Media 5(2): 117-150 (2014).
(Continued)

*Primary Examiner* — Utpal D Shah
(74) *Attorney, Agent, or Firm* — Wilson Sonsini Goodrich & Rosati

(57) ABSTRACT

Provided herein are methods and systems for determining joint information, such as joint angle and range of movement, quickly and accurately without using cumbersome, specialized equipment even when visibility to the joint may be limited. Such methods and systems may be achieved by using computationally efficient approaches that are accurate and robust enough to handle noises and occlusions. The methods and systems provided herein may provide quick, low-cost, on-demand approaches to obtain information about the joint health of a patient. The joint angle information may facilitate diagnosis, treatment, prognosis, and/or rehabilitation of the patient from a joint injury, pain, or discomfort by providing quick, actionable information to the healthcare provider.

20 Claims, 14 Drawing Sheets

(58) Field of Classification Search
CPC ............ G06T 2207/30196; G06T 7/73; G06V 10/7715; G06V 10/82
See application file for complete search history.

(56) References Cited

U.S. PATENT DOCUMENTS

| | | | | |
|---|---|---|---|---|
| 8,345,101 | B2 | 1/2013 | Bobbitt et al. | |
| 8,571,273 | B2 | 10/2013 | Li et al. | |
| 9,277,148 | B2 | 3/2016 | Bovik et al. | |
| 9,474,481 | B2 | 10/2016 | Dagum | |
| 9,922,432 | B1 | 3/2018 | Risser | |
| 10,460,443 | B2 | 10/2019 | Jeong et al. | |
| 10,830,850 | B2 | 11/2020 | Bi et al. | |
| 10,872,262 | B2 | 12/2020 | Yano et al. | |
| 10,922,573 | B2 | 2/2021 | Phan et al. | |
| 11,036,989 | B1 | 6/2021 | Assouline et al. | |
| 11,069,150 | B2 | 7/2021 | Sminchisescu et al. | |
| 11,107,280 | B1 | 8/2021 | Clohset et al. | |
| 11,182,924 | B1 * | 11/2021 | Akbas | A61B 5/7455 |
| 11,423,561 | B2 | 8/2022 | Okami et al. | |
| 11,482,048 | B1 | 10/2022 | Diaz-Arias et al. | |
| 11,694,123 | B2 | 7/2023 | Phan et al. | |
| 12,333,760 | B1 * | 6/2025 | Uguz | G09B 19/0038 |
| 2009/0125274 | A1 | 5/2009 | Waldock et al. | |
| 2013/0218529 | A1 | 8/2013 | Vikstrom et al. | |
| 2017/0042467 | A1 | 2/2017 | Herr et al. | |
| 2017/0161891 | A1 | 6/2017 | Madabhushi et al. | |
| 2018/0024641 | A1 | 1/2018 | Mao et al. | |
| 2019/0213406 | A1 | 7/2019 | Porikli et al. | |
| 2019/0244028 | A1 | 8/2019 | Jones et al. | |
| 2019/0371080 | A1 | 12/2019 | Sminchisescu et al. | |
| 2020/0125877 | A1 * | 4/2020 | Phan | G06N 3/04 |
| 2020/0272888 | A1 * | 8/2020 | Wang | G06N 3/08 |
| 2020/0302160 | A1 * | 9/2020 | Hashimoto | G06T 7/73 |
| 2021/0295088 | A1 * | 9/2021 | Su | G06V 10/48 |
| 2022/0108468 | A1 * | 4/2022 | Nakamura | G06T 7/73 |
| 2022/0296966 | A1 * | 9/2022 | Asikainen | G16H 20/30 |
| 2023/0096850 | A1 * | 3/2023 | Wang | G16H 50/20 382/103 |
| 2023/0141392 | A1 * | 5/2023 | Wu | G06V 10/764 345/419 |
| 2023/0162472 | A1 * | 5/2023 | Gor | G06V 10/462 382/100 |
| 2023/0201586 | A1 * | 6/2023 | Friedenberg | A61B 5/4528 607/48 |
| 2023/0252670 | A1 * | 8/2023 | Xiang | G06V 40/20 382/103 |
| 2023/0289666 | A1 | 9/2023 | Phan et al. | |
| 2025/0272871 | A1 * | 8/2025 | Lee | G06T 7/73 |

FOREIGN PATENT DOCUMENTS

| | | | |
|---|---|---|---|
| WO | WO-2012155077 | A2 | 11/2012 |
| WO | WO-2019032692 | A1 | 2/2019 |
| WO | WO-2020083831 | A1 | 4/2020 |
| WO | WO-2022136915 | A1 | 6/2022 |

OTHER PUBLICATIONS

Damianou, Andreas C. et al.: Variational Inference for Latent Variables and Uncertain Inputs in Gaussian Processes. The Journal of Machine Learning Research 17(42):1-62, 2016.

GB2311146.1 Examination Report under Section 18(3), dated Dec. 24, 2024.

Junwei et al., Advanced Deep-Learning Techniques for Salient and Category-Specific Object Detection: A Survey. IEEE Signal Processing Magazine 35(1): 84-100 (2018).

Mchutchson, Andrew and Rasmussen, Carl Edward. Gaussian process training with input noise. Advances in neural information processing systems, 24, pp. 1341-1349 (2011). Available at https://proceedings.neurips.cc/paper_files/paper/2011/file/a8e864d04c95572d1aece099af852d0a-Paper.pdf.

PCT/EP2019/078563 International Search Report and Written Opinion dated Feb. 4, 2020.

Rasmussen, Carl Edward. Gaussian Processes in Machine Learning. Article in Lecture Notes in Computer Science. pp. 63-71 (2004).

U.S. Appl. No. 16/167,300 Office Action dated May 28, 2020.

U.S. Appl. No. 17/144,315 Office Action dated Nov. 7, 2022.

Cao et al.: OpenPose: Realtime Multi-Person 2D Pose Estimation using Part Affinity Fields. arXiv preprint arXiv:1812.08008v2, 14 pages total (May 30, 2019).

Cao et al.: Realtime Multi-Person 2d Pose Estimation using Part Affinity Fields. arXiv preprint arXiv:1611.08050v2, 9 pages total (Apr. 14, 2017).

He et al.: Mask R-CNN. arXiv preprint arXiv:1703.06870v3, 12 pages total (Jan. 24, 2018).

PCT/IB2021/000879 International Search Report and Written Opinion dated Apr. 21, 2022.

Sambasivarao, K.: Non-maximum Suppression (NMS). towards data science, https://towardsdatascience.com/non-maximum-suppression-nms-93ce178e177c, 8 pages total, Oct. 1, 2019 (accessed on Dec. 29, 2020).

Simonyan et al.: Very Deep Convolutional Networks for Large-Scale Image Recognition. arXiv preprint arXiv:1409.1556v6, 14 pages total (Apr. 10, 2015).

Wang et al.: Leverage of Limb Detection in Pose Estimation for Vulnerable Road Users. IEEE Intelligent Transportation Systems Conference (ITSC), Auckland, NZ, Oct. 27-30, 2019, pp. 528-534 (2019).

Wei et al.: Convolutional Pose Machines. arXiv preprint arXiv:1602.00134v4, 9 pages total (Apr. 12, 2016).

Wei et al.: Convolutional Pose Machines. IEEE Conference on Computer Vision and Pattern Recognition, IEEE, Jun. 27, 2016, pp. 4724-4731 (2016).

Wikipedia. Blob Detection. https://en.wikipedia.org/wiki/Blob_detection, 9 pages total, last edited on Oct. 17, 2020 (accessed on Dec. 29, 2020).

Zhuang et al.: Human Pose Estimation using DirectionMaps. The 33rd Youth Academic Annual Conference of Chinese Association of Automation (YAC), IEEE, May 18-20, 2018, Nanjing, China, pp. 977-980 (2018).

* cited by examiner

JOINT ANGLE DETERMINATION UNDER LIMITED VISIBILITY

CROSS-REFERENCE

This application is a National Stage Entry of International Application No. PCT/IB2021/000879, filed Dec. 16, 2021, which claims the benefit of U.S. Provisional Application No. 63/128,576, filed Dec. 21, 2020, which is incorporated herein by reference in their entirety.

BACKGROUND

The ability to provide information about a joint, including a joint angle and range of motion of a joint, quickly in real-time and over time may offer a powerful tool to assist diagnosis, treatment, prognosis, and/or rehabilitation of a patient from a joint injury, pain, or discomfort. However, the determination of joint information may be hindered by limited visibility to the joint. In some cases, the joint may be covered by clothing that obscure and limit the view of the joint and its movement. In some cases, cumbersome, specialized equipments may be needed to image and process the images to determine the joint angle. As such, there is a need for methods and systems having the capability to quickly determine joint information, such as joint angle, even when the view of the joint is limited, using compact equipments to facilitate obtaining information about the joint and to improve patient outcomes.

SUMMARY

Described herein are methods and systems addressing a need to determine joint information, such as joint angle and range of movement, quickly and accurately without using cumbersome, specialized equipment. Such methods and systems may be achieved by using computationally efficient approaches that are accurate and robust enough to handle noises and occlusions and are compatible with compact equipments. The methods and systems provided herein may provide quick, low-cost, on-demand approaches to obtain information about the joint health of a patient. This may be performed by the patient in their homes without a need to visit a healthcare provider. The joint angle information may facilitate diagnosis, treatment, prognosis, and/or rehabilitation of the patient from a joint injury, pain, or discomfort by providing quick, actionable information to the healthcare provider.

Provided herein are computer-implemented methods for determining an angle in an object of interest, the method comprising: (a) obtaining an image or a video of the object of interest; (b) generating a plurality of key point heatmaps and a plurality of segment heatmaps from the image or the video; (c) blending at least one of the plurality of key point heatmaps with at least one of the plurality of segment heatmaps to generate at least one blended heatmap; (d) extracting features from the at least one blended heatmap; and (e) determining the angle in the object of interest by calculating an angle formed by the extracted features. In some embodiments, the extracted features comprise key points extracted from the at least one blended heatmap, wherein the angle formed by the extracted key points is defined by at least two extracted segments formed by connecting the extracted key points. In some embodiments, the extracted features comprise segments extracted from the plurality of segment heatmaps, wherein the angle formed by the extracted segments. In some embodiments, the extracted features comprise segments extracted from the at least one blended heatmap, wherein the angle formed by the extracted segments. In some embodiments, the extracted segment extracted using a line detection method. In some embodiments, the extracted segment extracted using Hough transform. In some embodiments, the object of interest comprises a joint of a subject. In some embodiments, the joint comprises a knee joint, a hip joint, an ankle joint, an elbow joint, or a shoulder joint. In some embodiments, the knee joint comprises lateral epicondyle. In some embodiments, the hip joint comprises greater trochanter. In some embodiments, the ankle joint comprises lateral malleolus. In some embodiments, the methods further comprise generating an output comprising the angle in the object of interest. In some embodiments, the methods comprise generating the plurality of key point heatmaps and the plurality of segment heatmaps in step (b) uses a deep neural network. In some embodiments, the deep neural network comprises convolutional networks. In some embodiments, the deep neural network comprises convolutional pose machine. In some embodiments, the deep neural network comprises a rectified linear unit (ReLU) activation function. In some embodiments, the plurality of key point heatmaps represents landmarks on the image or the video of the object of interest. In some embodiments, the landmarks comprise a joint and at least one body part adjacent to the joint. In some embodiments, the plurality of segment heatmaps represents segments along a body part adjacent to a joint. In some embodiments, one of the segments connects at least two of the landmarks along a body part adjacent to a joint. In some embodiments, step (b) further comprises generating a combined negative heatmap from the image or the video for training the deep neural network. In some embodiments, step (c) blends the at least one of the plurality of key point heatmaps that represents a key point spatially adjacent to a segment represented by the at least one of the plurality of segment heatmaps. In some embodiments, blending comprises taking an average of pixel intensity at each corresponding coordinate of at least one of the plurality of key point heatmaps and at least one of the plurality of segment heatmaps. In some embodiments, blending provides improved handling of a noisy heatmap or a missing heatmap. In some embodiments, extracting the key points in step (d) uses at least one of non-maximum suppression, blob detection, or heatmap sampling. In some embodiments, extracting the key points comprises selecting coordinates with highest pixel intensity in the at least one blended heatmap. In some embodiments, at least three key points are extracted. In some embodiments, the plurality of key point heatmaps or the plurality of segment heatmaps comprises at least two heatmaps.

Provided herein are computer-based systems for determining an angle in an object of interest, the system comprising: (a) a processor; (b) a non-transitory medium comprising a computer program configured to cause the processor to: (i) obtain an image or a video of the object of interest and input the image or the video into a computer program; (ii) generate, using the computer program a plurality of key point heatmaps and a plurality of segment heatmaps from the image or the video; (iii) blend, using the computer program, at least one of the plurality of key point heatmaps with at least one of the plurality of segment heatmaps to generate at least one blended heatmap; (iv) extract, using the computer program, features from the at least one blended heatmap; and (v) determine, using the computer program, the angle in the object of interest by calculating an angle formed by the extracted features. In some embodiments, the extracted features comprise key points extracted from the at least one blended heatmap, wherein the angle formed by the extracted key points is defined by at least two extracted segments formed by connecting the extracted key points. In some embodiments, the extracted features comprise segments extracted from the plurality of segment heatmaps, wherein the angle formed by the extracted segments. In some embodiments, the extracted features comprise segments extracted from the at least one blended heatmap, wherein the angle formed by the extracted segments. In some embodiments, the extracted segment extracted using a line detection method. In some embodiments, the extracted segment extracted using Hough transform. In some embodiments, the object of interest comprises a joint of a subject. In some embodiments, the joint comprises a knee joint, a hip joint, an ankle joint, an elbow joint, or a shoulder joint. In some embodiments, the knee joint comprises lateral epicondyle. In some embodiments, the hip joint comprises greater trochanter. In some embodiments, the ankle joint comprises lateral malleolus. In some embodiments, the computer program is configured to cause the processor to generate an output comprising the angle. In some embodiments, the computer program comprises a deep neural network. In some embodiments, the deep neural network comprises convolutional networks. In some embodiments, the deep neural network comprises convolutional pose machines. In some embodiments, the deep neural network comprises a rectified linear unit (ReLU) activation function. In some embodiments, the plurality of key point heatmaps represents landmarks on the image or the video of the object of interest. In some embodiments, the plurality of landmarks comprises a joint and a body part adjacent to the joint. In some embodiments, the plurality of segment heatmaps represents segments along a body part adjacent to a joint. In some embodiments, one of the segments connects at least two of the landmarks along a body part adjacent to a joint. In some embodiments, step (b)(ii) further comprises generating a combined negative heatmap from the image or the video for training the deep neural network. In some embodiments, step (b)(iii) blends the at least one of the plurality of key point heatmaps that represents a key point spatially adjacent to a segment represented by the at least one of the plurality of segment heatmaps. In some embodiments, blending comprises taking an average intensity of pixels at each corresponding coordinate of at least one of the plurality of key point heatmaps and at least one of the plurality of segment heatmaps. In some embodiments, blending provides improved handling of a noisy heatmap or a missing heatmap. In some embodiments, extracting the key points uses at least one of non-maximum suppression, blob detection, or heatmap sampling. In some embodiments, extracting the key points comprises selecting coordinates with highest intensity in the at least one blended heatmap. In some embodiments, at least three key points are extracted. In some embodiments, the plurality of key point heatmaps or the plurality of segment heatmaps comprises at least two heatmaps. In some embodiments, the system comprises a mobile phone, a tablet, or a web application.

INCORPORATION BY REFERENCE

All publications, patents, and patent applications mentioned in this specification are herein incorporated by reference to the same extent as if each individual publication, patent, or patent application was specifically and individually indicated to be incorporated by reference.

BRIEF DESCRIPTION OF THE DRAWINGS

The novel features of the disclosure are set forth with particularity in the appended claims. A better understanding of the features and advantages of the present disclosure will be obtained by reference to the following detailed description that sets forth illustrative embodiments, in which the principles of the disclosure are utilized, and the accompanying drawings of which:

FIG. 9A continues into FIG. 9B, which continues to FIG. 9C, which continues to FIG. 9D.

DETAILED DESCRIPTION

Figure 1:
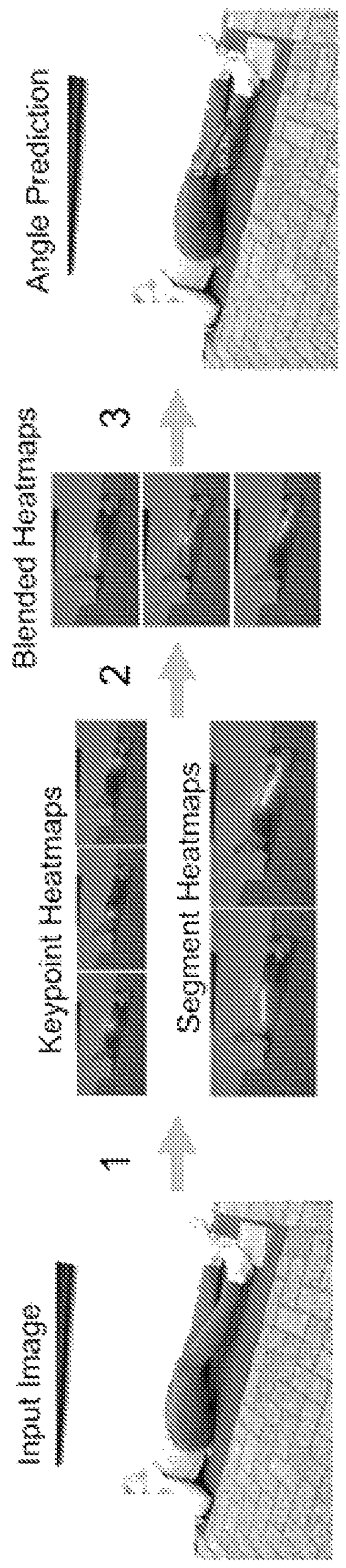
FIG. 1 shows an exemplary embodiment an overview of the methods and systems described herein for predicting joint angle of a patient under limited visibility.

Accurately and quickly detecting body landmarks and estimating human pose may be challenging in computer vision. There is a need for improving the performance of a general purpose system that is capable of estimating human pose from images or videos, especially those that are not using fiduciary markers and are markerless. Often, such methods and systems have difficulty reaching the accuracy level in their determination of joint angle and range of motion that may be suitable for application in real-world settings, including but not limited to surgical planning, diagnosis, treatment, or rehabilitation plans.

Provided herein are methods and systems for determining an angle of an object of interest, including an angle of a joint, by analysis of an image or a video frame. Such methods and systems described herein allow for a quick, efficient, and accurate determination of the angle of the object of interest using computationally efficient methods described herein, even when the view of the object is obstructed by clothing or other objects. Even when a key information about a reference point for the joint, such as the location of the ankle or a lower tibia area for a knee joint, is missing, the methods and systems described herein is capable of quickly determining the joint angle. The ability to determine the joint angle quickly, in or near real-time and/or over time, using a simple, compact system may be valuable for patients and healthcare providers in assessing the joint health. The joint angle information gathered using the methods and systems described herein may provide a valuable tool to assist diagnosis, treatment, prognosis, and/or rehabilitation of the patient from a joint injury, pain, or discomfort and may help provide quick, actionable information to the healthcare provider. Such methods and systems having the capability to determine joint information, such as joint angle and movement, quickly with compact equipment may be valuable in facilitating obtaining information about the joint and improving patient outcomes.

Usually, a joint of the patient is imaged as an image or a video using a device having a camera. Often, the device is a simple, compact, easy-to-use device. In some cases, the device is a mobile device or a mobile phone. The image or video obtained may undergo processing by using a deep neural network to generate a plurality of key point heatmaps and a plurality of segment heatmaps from the image or the video. In some cases, for a knee joint, there may be three key points on the femur and the tibia and at the knee, and two segments drawn from tkey point on the femur to the knee and from key point on the tibia to the knee. In some cases, for a knee joint, there are three key point heatmaps, corresponding to the three key points on the femur and the tibia and at the knee, and two segment heatmaps, corresponding to the two segments drawn from the key point on the femur to the knee and from the key point on the tibia to the knee. In some cases, at least one of the key points may be missing due to occlusion or noise in the input image or video. At least one of the plurality of key point heatmaps may be blended with at least one of the plurality of segment heatmaps to generate at least one blended heatmap. In some cases, the blended heatmap allows for a more robust analysis against occlusion and noise. Then, features of interest may be extracted from the blended heatmap, and an angle formed by the extracted features may be calculated to determine the joint angle.

Often, the methods and systems provided herein are compatible with input images and/or videos where the object of interest is partially obstructed or is noisy. The methods and systems provided herein are robust enough to determine the angle of the object of interest from input images and/or videos that are missing information about the object of interest. In some cases, the methods and systems described herein may be used to determine a joint angle. Sometimes, the algorithm for the methods and systems described may run more efficiently when all key points are visible in the input image or video. Sometimes, in real world applications, not all key points are visible in the input image or video. Sometimes, one or more key points may be missing in the input image or video. In some cases, the image or video data may be difficult to obtain from one or more key points due to noise. In some cases, one or more key points may be obstructed or occluded. In some cases, one or more key points may be obstructed, occluded, or covered. In some cases, one or more key points may be obstructed, occluded, or covered by clothing. In some cases, the view to the hip or upper leg may be obstructed by a jacket or a long top. In some cases, the ankle or lower leg may be covered by shoes or socks. The methods and systems provided herein overcomes the issue with limited visibility of key points with its capability to use a narrow window around a joint to determine the joint angle.

Described herein are methods and systems addressing a need to determine joint information, such as joint angle and movement, quickly without using specialized equipment. By using lightweight compact algorithms enables such methods and systems to run significantly faster. The use of the new deep neural network architectures and data representation described herein in may enable the speed, accuracy, efficiency, and robustness of the methods and systems described herein. Such methods and systems make it feasible to embed the imaging and analysis algorithm into applications for mobile devices, such as a mobile phone or a tablet. Such methods and systems allow for a quick determination of the joint angle, in or near real-time, using computationally efficient methods, even when the joint is obscured by clothing or other objects. Such methods and systems allow for determination of the joint angle without a need for specialized equipment for imaging and data processing or a special setting, such as a healthcare provider's office.

The compatibility of the methods and systems provided herein allow for their use in remote settings or in settings without a healthcare provider. The methods and systems provided herein may be compatible with compact, easily accessible equipment, such a mobile device having a camera or a video camera, which are user-friendly. In some cases, the methods and systems described herein may be performed by a patient in their homes without a need to visit a healthcare provider. In some cases, the methods and systems described herein may be performed on a patient by a healthcare provider. The methods and systems provided herein may provide quick, low-cost, on-demand approaches to obtain information about the joint health of the patient.

Other approaches for methods and systems for angle determination may have various drawbacks. Sometimes, other approaches may need to be trained on a large number of data points to achieve a low level of accuracy. In some cases, other approaches may need millions of data points to achieve a ±10 degrees of accuracy. In some cases, such low degree of accuracy makes the angle determination difficult to use in a clinical context. In some cases, other approaches may be very costly in terms of computation and storage. In some cases, other approaches may have so many parameters, making it difficult to implement efficiently on mobile devices and web-based applications due to storage and computational limitations. In some cases, other pose estimation systems may require complicated post-processing steps to convert raw machine learning predictions to final output of the angles of the object of interest.

The methods and systems provided herein have a number of advantages. The advantages include but are not limited to a robust handling of occlusion of key points in the input image or video data or noisy input image or video data, compatibility with a mobile application using a compact device, efficiency in computation and in data storage, and few post-processing steps.

System Overview

The methods and systems provided herein allow for determination of angles of the object of interest, even when the object may be partially obstructed or have limited visibility. The methods and systems are capable of robust handling of input images or videos missing key point data, have few post-processing steps, and are computationally efficient to have low computation and storage demands. Often, the object of interest may be a joint in a subject, and the angle of the object of interest may be a joint angle.

Often, the methods and systems provided herein may take an input data of a color image of a human figure and may output angle measurements of a selected joint of the human figure. The system receives in input data comprising an image or a video of the subject. Usually, the image or the video shows one or more joints of the subject. In some cases, the input data may be a color image or video. In some cases, the input data may be an RGB (red, green, blue) image or video. In some cases, the input data may be a black and white image or video. In some cases, the input data may be an image comprising a human subject. In some cases, the input data may be an image comprising an animal subject.

FIG. 1 shows an exemplary overview of the methods and systems provided herein for determining a joint angle of a knee joint of a subject. Such methods and systems may be applied to any joint of the subject or any object of interest having an angle. The methods and systems provided herein are described for an example of a knee joint as the object of interest but may be applied to other joints of the subject, such as hip, shoulder, elbow, ankle, or neck. In some cases, the joint comprises an articulating joint. In the first processing step (step 1), machine learning may be used to predict approximate locations of the body landmarks (also referred herein key points) and segments relevant to the joint of interest. In some cases, the machine learning comprises an artificial neural network. In some cases, the artificial neural network comprises a deep neural network. In some cases, the relevant key points and segments are represented by a set of key point heatmaps and a set of segment heatmaps, respectively. In some cases, drawing a line in between at least two key points predicted by the key point heatmaps may correspond to a segment predicted by one of the segment heatmaps. In some cases, points along a segment predicted by a segment heatmap may generally correspond to at least two key points predicted by the key point heatmaps. In some cases, at least one of the points along the segment is an endpoint of the segment. In the second processing step (step 2), the key point heatmaps and segment heatmaps are blended together to generate blended heat maps. In some cases, this blending step enables the generation of heatmaps that may be more robust against occlusion and other types of noise in the input image. In the third processing step (step 3), a set number of key points or segments may be extracted from the blended heatmaps and may be used to calculate the joint angle. In some cases, three key points are extracted from the blended heatmaps. In some cases, two segments are extracted from the blended heatmaps.

The methods and systems described herein have various advantages. First, the methods and systems provided herein may be compact and lightweight in terms of computation, allowing for efficient implementation that are compatible with uses of the methods and systems provided herein in on efficient mobile devices and web-based applications. Second, the methods and systems provided herein may be capable of tolerating real-world noises in the input data, including but not limited to occlusion or obstruction of a part of the object of interest or a key point of the object of interest, poor lighting conditions, or low-quality imaging system. The methods and systems provided herein may be capable of tolerating limited visibility of the object of interest in the input data. Third, the methods and systems provided herein may predict joint angles with a high level of accuracy that methods and systems provide useful, meaningful, and actionable information within clinical contexts. In some embodiments, the accuracy in the predicted angle of the object of interest is within at least 20 degrees, 15 degrees, 14 degrees, 13 degrees, 12 degrees, 11 degrees, 10 degrees, 9 degrees, 8 degrees, 7 degrees, 6 degrees, 5 degrees, 4 degrees, 3 degrees, 2 degrees, or 1 degree of the actual angle of the object of interest. In some embodiments, the accuracy in the predicted angle of the object of interest is within at least 20%, 15%, 14%, 13%, 12%, 11%, 10%, 9%, 8%, 7%, 6%, 5%, 4%, 3%, 2%, or 1% of the actual angle of the object of interest. In some embodiments, the accuracy in predicted angle required to be usable in a clinical context is at least 10 degrees, 9 degrees, 8 degrees, 7 degrees, 6 degrees, 5 degrees, 4 degrees, 3 degrees, 2 degrees, or 1 degree.

Predicting Key Points and Segments

The methods and systems described herein may use machine learning to predict relevant landmarks and segments and generate landmark heatmaps and segment heatmaps. Usually, the landmark is represented by a key point in a key point heatmap. Often, the key point may correspond to a body part of the subject. Sometimes, the segment corresponds to a long bone of the subject. In some embodiments, the machine learning comprises an artificial neural network. In some embodiments, the artificial neural network comprises a deep neural network. In some embodiments, the artificial neural network comprises a convolution neural network (CNN). In some embodiments, an architecture of the neural network may be based on Convolutional Pose Machine.

Figure 3:
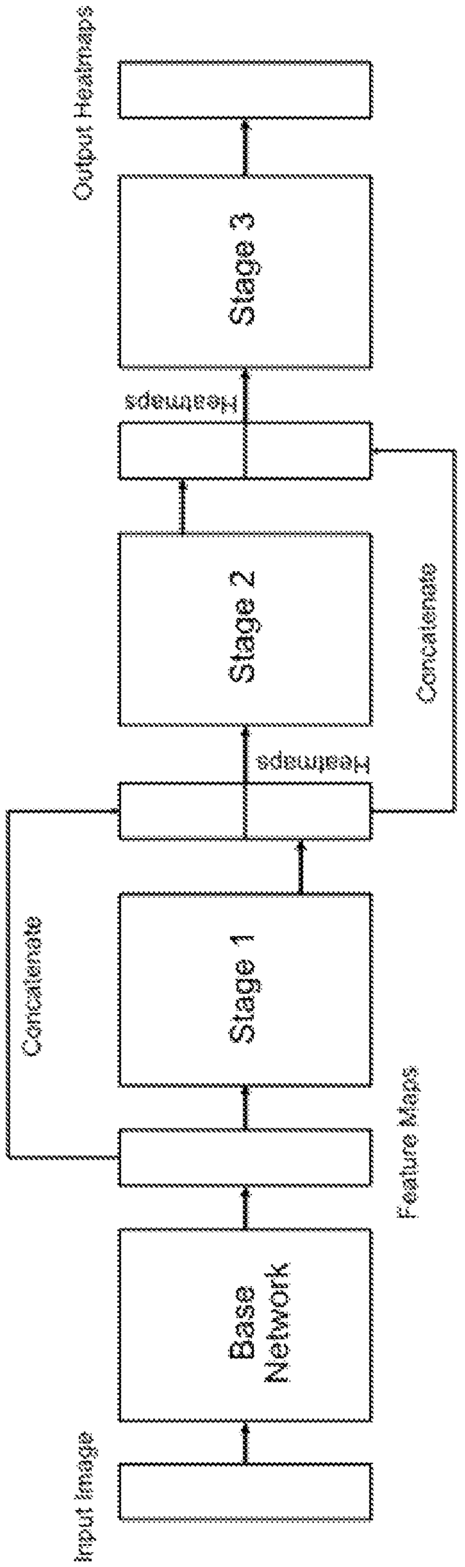
FIG. 3 shows exemplary embodiments of a high-level view of the network architecture comprising a base network for feature extraction and processing stages, which may be used to incrementally refine the heatmap prediction.
Figure 9A:
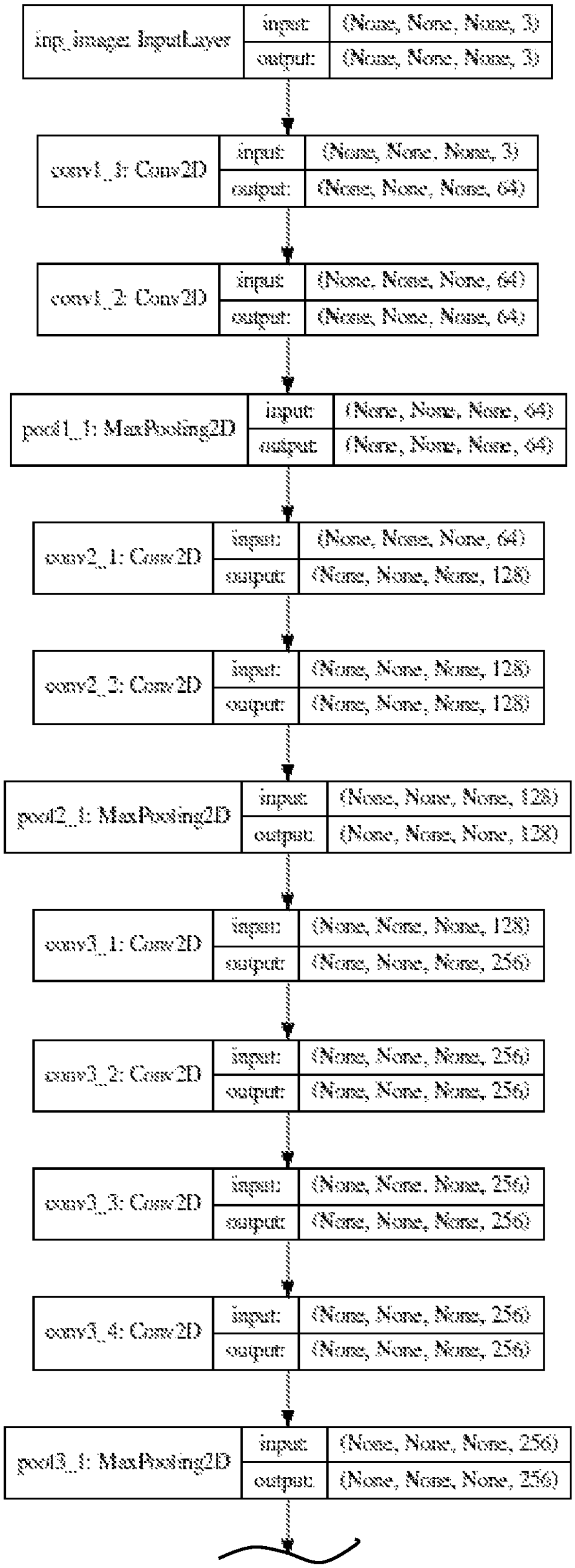
FIGS. 9A-9D show an exemplary embodiment of a neural network architecture used for predicting joint angle.
Figure 9B:
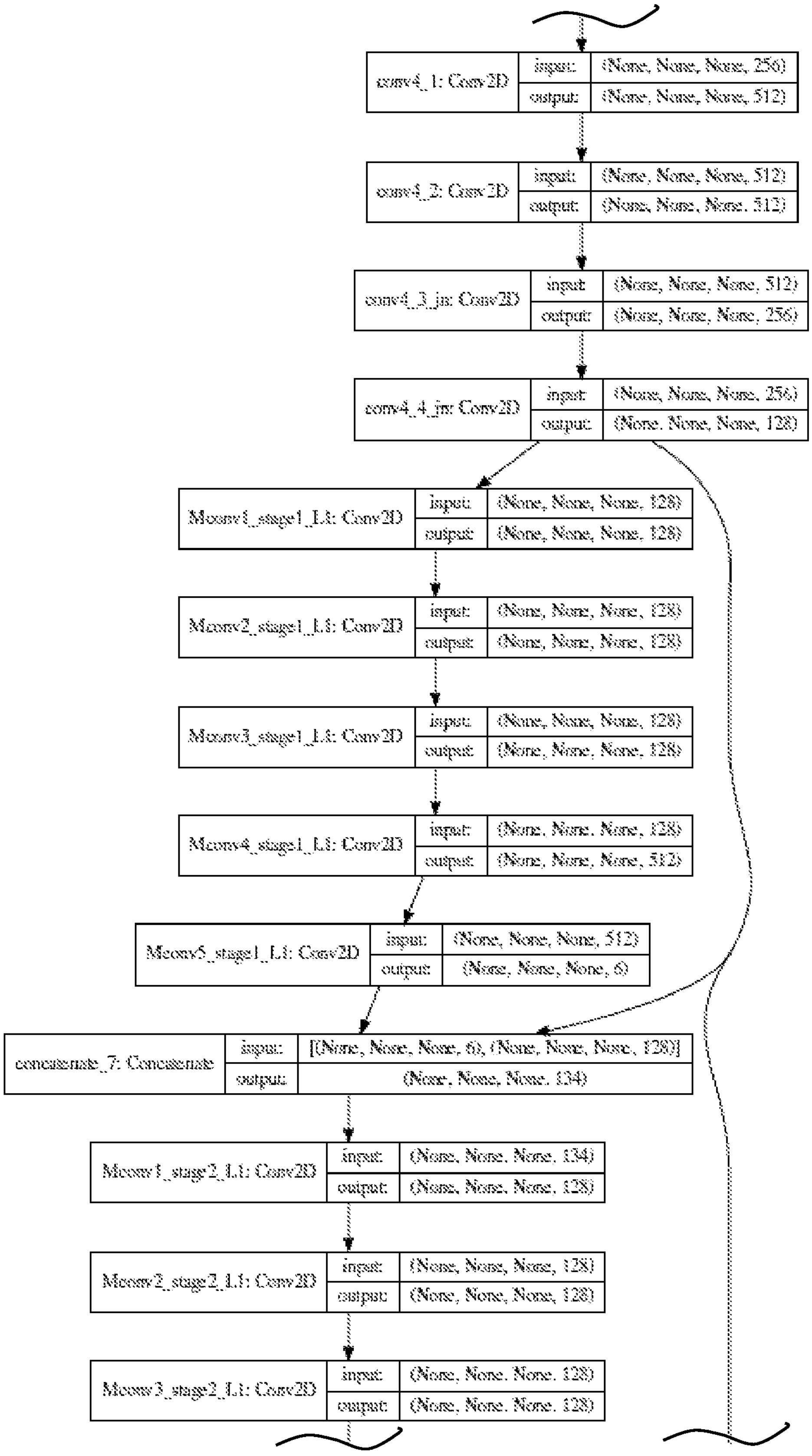
Figure 9C:
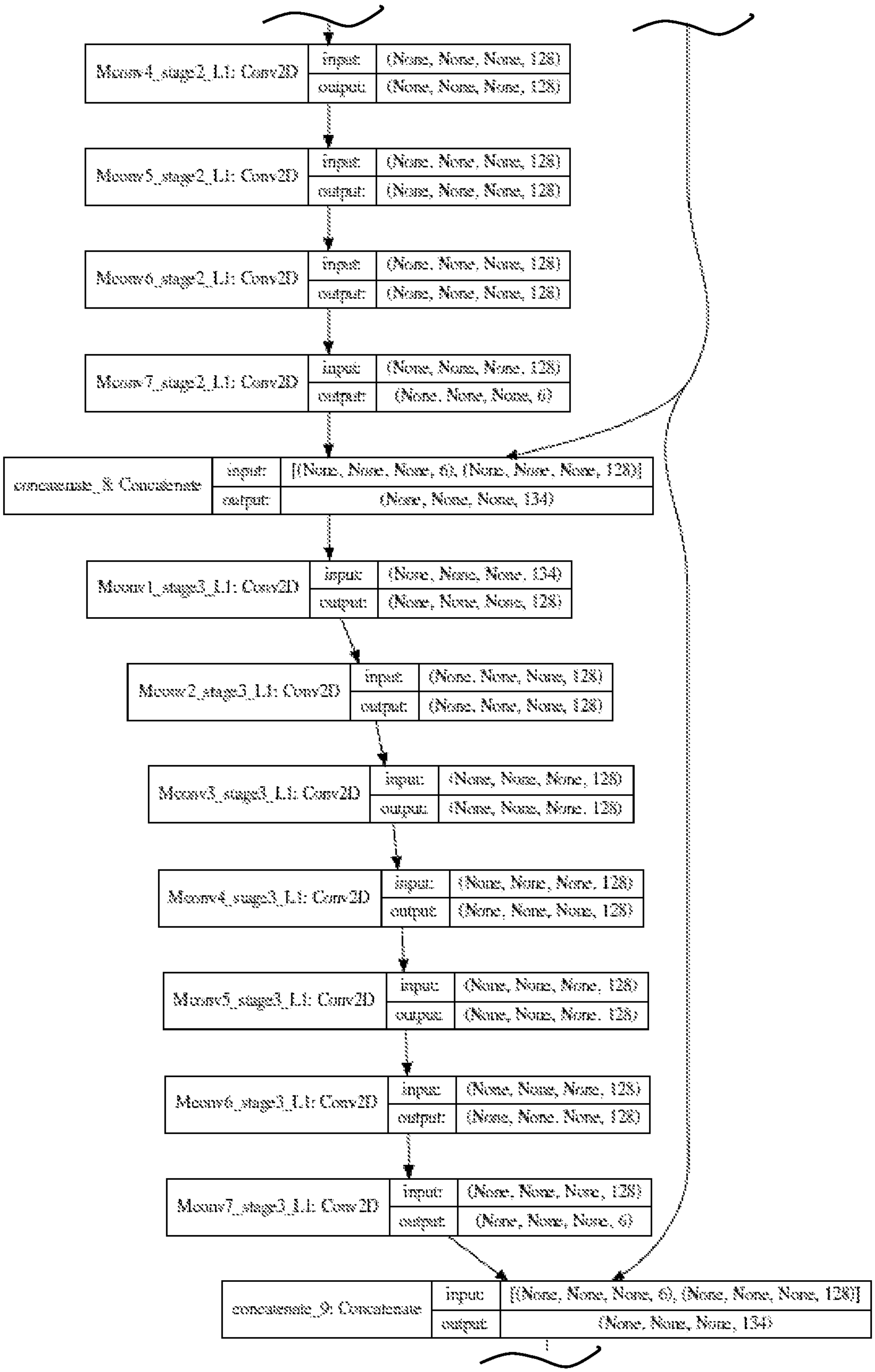
Figure 9D:
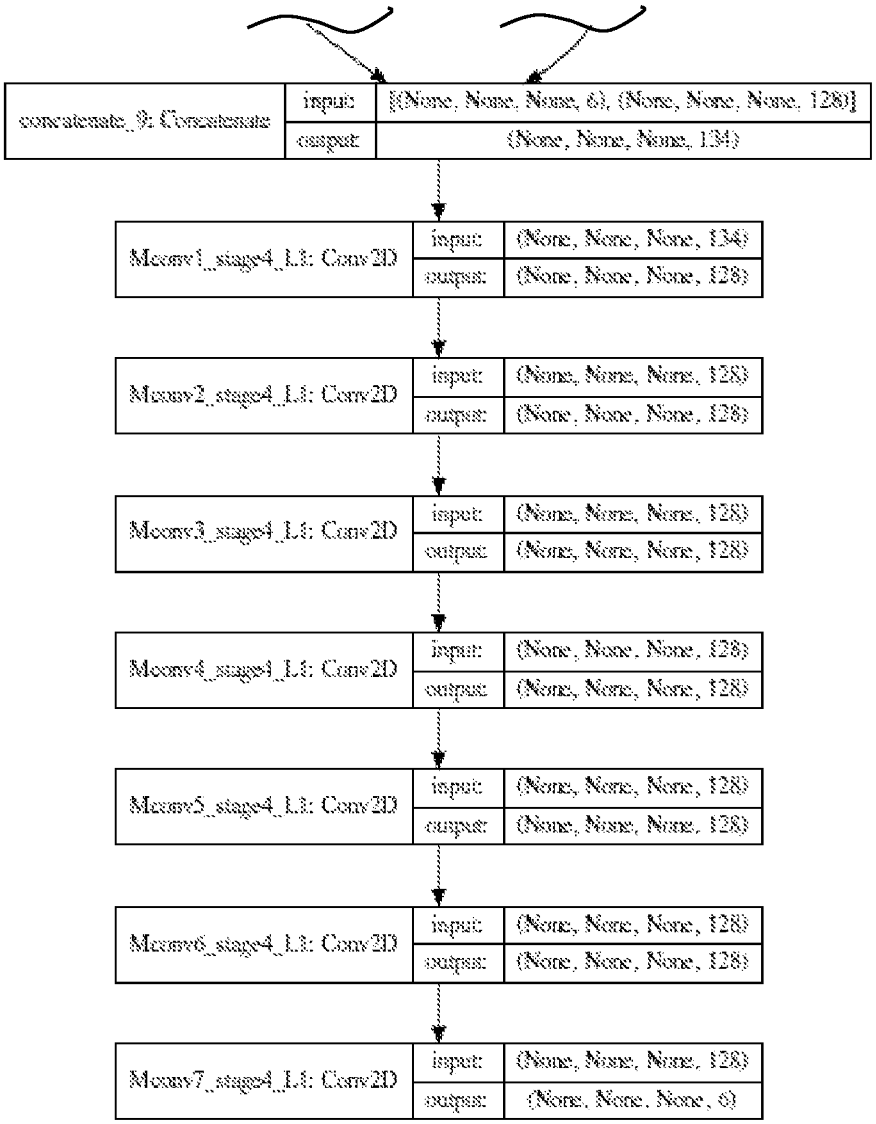

FIG. 3 shows exemplary embodiments of a high-level architecture of the neural network comprising a base network for feature extraction and processing stages, which may be used to incrementally refine the heatmap prediction. In some embodiments, the base network is used for classification and detection of the key points and segments from the input data. In some embodiments, the base network comprises CNN. In some embodiments, the base network comprises a VGG16 network. In some embodiments, the base network comprises a simplified VGG16 network having convolutional layers, pooling layers, and rectified linear unit (ReLU) activations. In some embodiments, the base network comprises a simplified VGG16 network with 12 convolutional layers, 2 pooling layers and ReLU activations. As shown in FIG. 3, Stage 1 block comprises a convolutional network having a plurality of convolutional layers and ReLU activations (except for the last layer). The Stage 2 and Stage 3 blocks, as shown in FIG. 3, comprise convolutional networks having a plurality of convolutional layers and ReLU activations (except for the last layers). In some embodiments, the plurality of convolutional layers comprises at least 2, 3, 4, 5, 6, 7, 8, 9, 10, 11, 12, 13, 14, 15, 16, 17, 18, 19, or 20 convolutional layers. In some embodiments, the plurality of convolutional layers comprises 2, 3, 4, 5, 6, 7, 8, 9, 10, 11, 12, 13, 14, 15, 16, 17, 18, 19, or 20 convolutional layers. In some embodiments, the plurality of convolutional layers comprises 5 convolutional layers. In some embodiments, the plurality of convolutional layers comprises 7 convolutional layers. In some embodiments, the plurality of convolutional layers for Stage 1 block comprises 5 convolutional layers. In some embodiments, the plurality of convolutional layers for Stage 2 and Stage 3 blocks is 7 convolutional layers. In some embodiments, the last convolutional layer is not followed by RELU activations. FIGS. 9A-9D show an example of a full network for determining the joint angle of the joint. FIG. 9A continues into FIG. 9B, which continues to FIG. 9C, which continues to FIG. 9D.

In some embodiments, the neural network receives an input data of an image or a video and generates an output of a set of heatmaps. Often, the methods and systems provided herein receives in input data comprising an image or a video of the subject. Usually, the image or the video shows one or more joints of the subject. In some cases, the input data may be a color image or video. In some cases, the input data may be an RGB (red, green, blue) image or video. In some cases, the input data may be a black and white image or video. In some embodiments, a view of a landmark of the body part of the subject may be obstructed or obscured in the input image or video. In some embodiments, information about a key point of the joint may be missing from the input image or video. In some embodiments, a view of the ankle and the lower leg may be obscured in the input image for determining a knee joint angle. In some embodiments, a view of the hip and the upper leg may be obscured in the input image for determining a knee joint angle. In some embodiments, the heatmaps represent different landmarks (key points) and segments of the body of the subject. In some embodiments, a plurality of heatmaps are generated by the neural network. In some embodiments, the neural network generates a plurality of key point heatmaps and a plurality of segment heatmaps. In some cases, the relevant landmarks (key points) are represented by a set of key point heatmaps. In some cases, the relevant segments are represented by a set of segment heatmaps. In some cases, drawing a line in between at least two key points predicted by the key point heatmaps may correspond to a segment predicted by one of the segment heatmaps. In some cases, points along a segment predicted by a segment heatmap may generally correspond to at least two key points predicted by the key point heatmaps. In some cases, at least one of the points along the segment is an endpoint of the segment. In some embodiments, the plurality of key point heatmap comprises at least 3, 4, 5, 6, 7, 8, 9, or 10 key point heatmaps. In some embodiments, the plurality of key point heatmap comprises 3, 4, 5, 6, 7, 8, 9, or 10 key point heatmaps. In some embodiments, the plurality of segment heatmap comprises at least 2, 3, 4, 5, 6, 7, 8, 9, or 10 segment heatmaps. In some embodiments, the plurality of segment heatmap comprises 2, 3, 4, 5, 6, 7, 8, 9, or 10 segment heatmaps. In some embodiments, each key point heatmap comprises one key point. In some embodiments, each key point heatmap comprises 2, 3, segment. In some embodiments, each segment heatmap comprises 2, 3, 4, 5, 6, 7, 8, 9, or 10 segments. In some embodiments, the neural network generates 6 heatmaps for the knee joint, divided into 2 groups of landmark heatmaps (also referred herein as key point heatmaps) and segment heatmaps. In some embodiments, the neural network generates 3 key point heatmaps for the knee joint. In some embodiments, the neural network generates at least 2 segment heatmaps for the knee joint.

Figure 2:
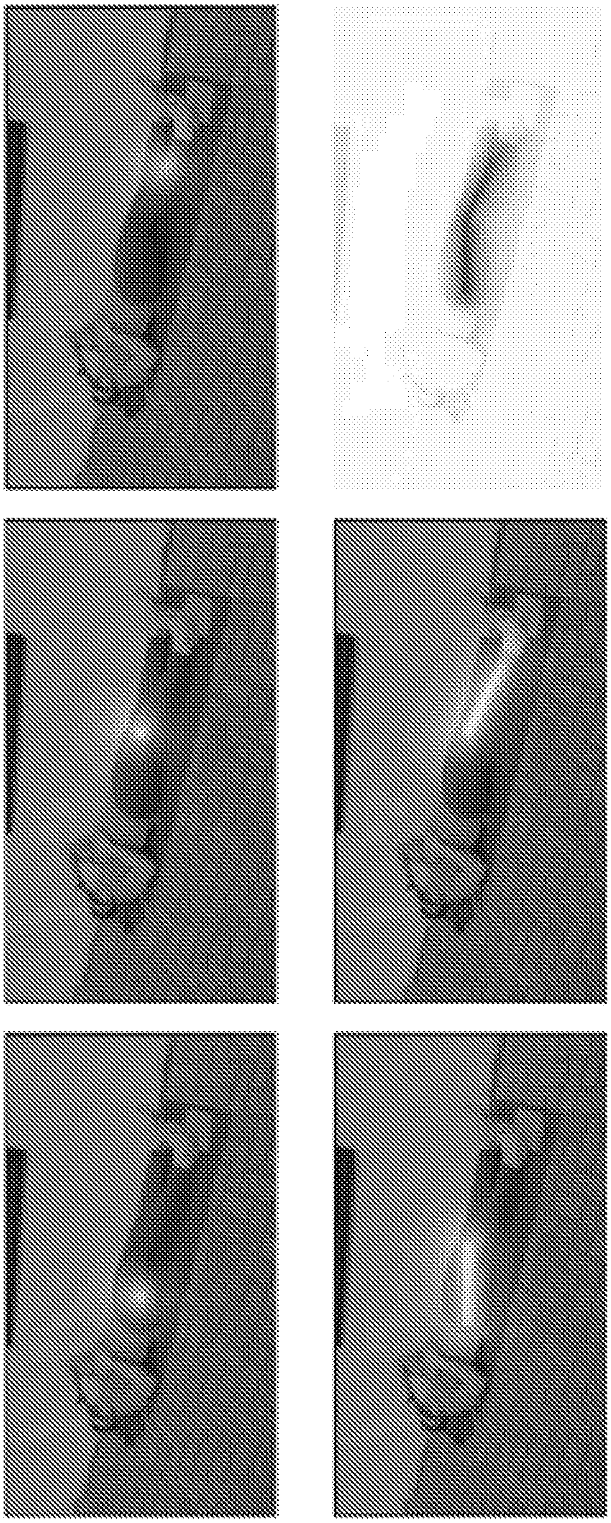
FIG. 2 shows an exemplary embodiment key point heatmaps and segment heatmaps generated from an image of the joint of the patient. The three key point heatmaps on the top row represent landmarks on and around the joint, and two segment heatmaps on bottom left and middle represent the limbs around the joint. A combined negative heatmap on the bottom right may be used to train the neural network

FIG. 2 shows an exemplary embodiment key point heatmaps and segment heatmaps generated from an image of the joint of the patient along with a blended heatmap. The three key point heatmaps on the top row represent landmarks on and around the joint (the knee joint, and 2 points on the lower part and upper part of the leg), and two segment heatmaps on bottom left and middle represent the limbs around the joint (lower part and upper part of the leg). A combined negative heatmap on the bottom right may be used to train the neural network.

Figure 4:
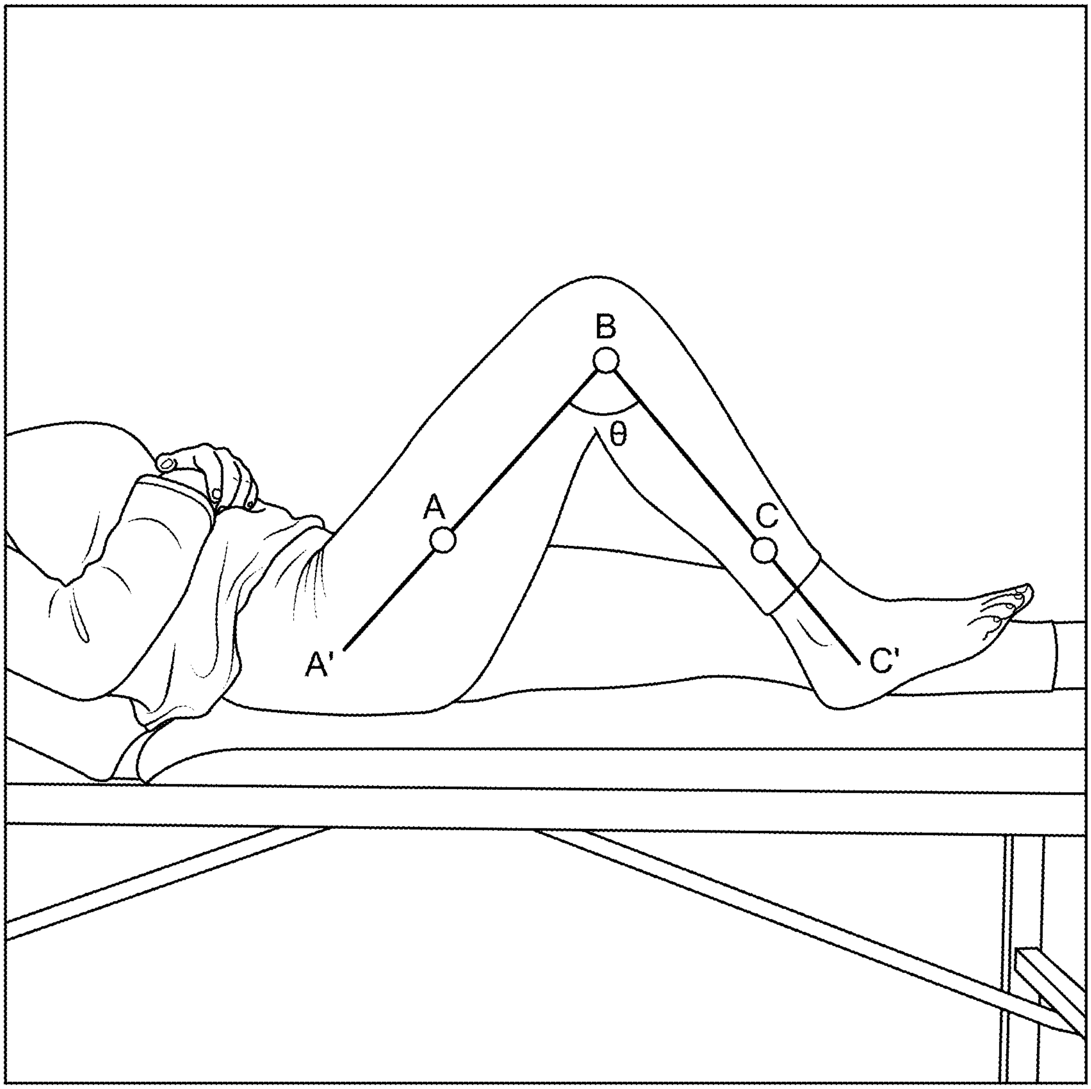
FIG. 4 shows an exemplary embodiment three key points (A, B, C) along with extended line segments (between A' and B and between B and C') used for measurement of a knee joint angle (θ).

FIG. 4 shows configuration of the three key points (A, B, C) along with extended line segments (between A' and B and between B and C') used for measurement of a knee joint angle (θ). In some embodiments, key point B may be placed at or near the lateral epicondyle (LE) of the femur. In some embodiments, key points A and C lie on to the line segments connecting the LE with A' (the lateral greater trochanter) and B' (the lateral malleolus). In some embodiments, the exact positions are defined by: $BA=\lambda*BA'$ and $BC=\lambda*BC'$, where $0<\lambda\leq 1$ is a constant. In some embodiments, the angle $\theta=\widehat{ABC}$ is the joint angle of interest.

Blending Heatmaps

The methods and systems described herein may blend the key point heatmaps and segment heatmaps into new combined, blended heatmaps. Usually, the blending step comprises fusing the information about the key points and the segments together. Often, the blending step comprises fusing the key point heatmaps and the segment heatmaps to generate one or more blended heatmaps. In some embodiments, blending comprises taking an average intensity of the pixels at corresponding coordinates of the heatmaps that are being blended. In some embodiments, the average intensity is calculated by taking a mean. In some embodiments, the average intensity is calculated by taking a median. In some embodiments, the average intensity is calculated by taking a weighted average. In some embodiments, the blended heatmaps comprise information about the key points and the segments generated from the input data. In some embodiments, the key point heatmaps and the segment heatmaps are weighted as they are combined in the blending step. In some embodiments, the key point heatmaps and the segment heatmaps are combined without weighting in the blending step. In some embodiments, blending of the key point heatmaps and segment heatmaps into new blended heatmaps allows the methods and systems provided herein to make more robust predictions of the angle of the object of interest. In some embodiments, the blending step allows the neural networks to overcome missing or noisy heatmaps. In some embodiments, the blending step allows the neural networks to fill in one or more missing key points. In some embodiments, the blending step allows the neural networks to fill in one or more missing portions of one or more segments. In some embodiments, the blending step allows the neural networks to make better reasoning in determining the angle of the object of interest.

In some embodiments, blending comprises taking an average intensity of the pixels at all of the corresponding coordinates of the heatmaps that are being blended. In some embodiments, blending comprises taking an average intensity of the pixels at a portion of the corresponding coordinates of the heatmaps that are being blended. In some embodiments, the portion of the corresponding coordinates of the heatmaps that are being blended if focused on portions with pixel intensities above a set threshold value. In some embodiments, the portion of the corresponding coordinates of the heatmaps that are being blended comprises at most 10%, 20%, 30%, 40%, 50%, 60%, 70%, 80%, or 90% of the heatmap coordinates. In some embodiments, the portion of the corresponding coordinates of the heatmaps that are being blended comprises at least 10%, 20%, 30%, 40%, 50%, 60%, 70%, 80%, or 90% of the heatmap coordinates. In some embodiments, the portion of the corresponding coordinates of the heatmaps that are being blended comprises 10%, 20%, 30%, 40%, 50%, 60%, 70%, 80%, or 90% of the heatmap coordinates.

In some embodiments, at least one key point heatmap is blended with at least one segment heatmap to generate a new blended heatmap comprising key point and segment information. In some embodiments, one key point heatmap is blended with one segment heatmap to generate a new blended heatmap. In some embodiments, one key point heatmap is blended with two segment heatmaps to generate a new blended heatmap. In some embodiments, two key point heatmaps are blended with one segment heatmaps to generate a new blended heatmap. In some embodiments, two key point heatmaps are blended with two segment heatmaps to generate a new blended heatmap. In some embodiments, three key point heatmaps are blended with two segment heatmaps to generate a new blended heatmap.

Figure 5:
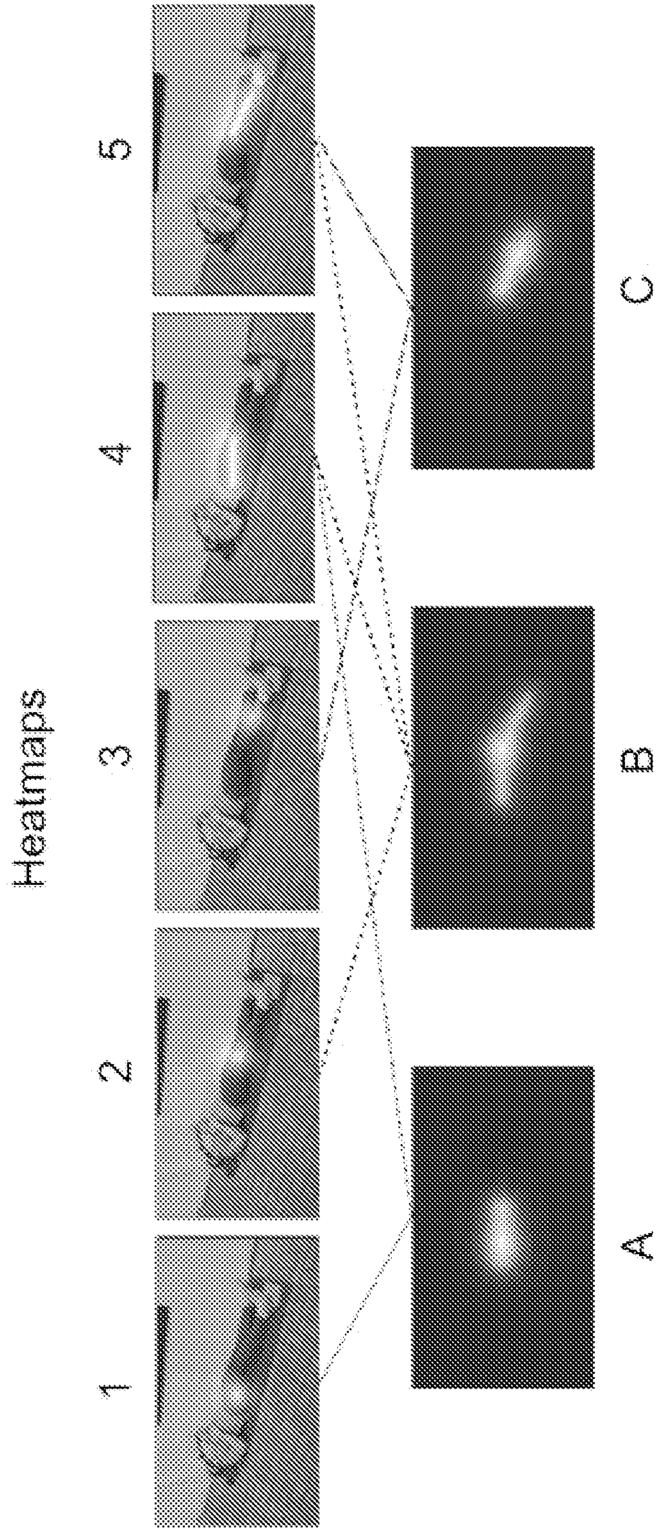
FIG. 5 shows an exemplary embodiment blending the key point and segment heatmaps for improved noise handling.

FIG. 5 shows an exemplary embodiment blending the key point and segment heatmaps for improved noise handling. In some embodiments, a key point heatmap 1, which is generated for landmark (key point) A in FIG. 4, is blended with a segment heatmap 4, corresponding to segment AB or segment A'B in FIG. 4 that correspond to the upper leg, by taking the average intensity of the pixels at corresponding coordinates of the key point heatmap 1 and segment heatmap 4. In some embodiments, the pixel intensities at coordinate (i,j) of key point heatmap 1 and segment heatmap 4 may be designated as $I^1(i,j)$, $I^4(i,j)$, respectively. In some embodiments, a blended heatmap A from blending of key point heatmap 1 and segment heatmap 4 has an intensity value $I^A(i,j)=(I^1(i,j)+I^4(i,j))/2$ at the same coordinate. In some embodiments, a blended heatmap A is fused by averaging the pixel intensity at corresponding coordinates of key point heatmap 1 and segment heatmap 4. In some embodiments, key point heatmap 3, corresponding to a landmark near the ankle or lower leg or key point C in FIG. 4, and segment heatmap 5, corresponding to segment BC or segment BC' in FIG. 4 that correspond to the lower leg, are averaged to form a blended heatmap C that comprises information for key point C. In some embodiments, key point heatmap 2, corresponding to key point B in FIG. 4 that correspond to the knee joint or lateral epicondyle of the femur, and segment heatmaps 4 and 5, which correspond to the upper and the lower legs, are averaged to generate a blended heatmap B that comprises information for key point B.

Extraction and Joint Angle Calculation

The methods and systems described herein may extract information about key points, lines, or both from the heatmaps to calculate the angle of the object of interest. In some embodiments, information about key points, lines, or both may be extracted from the blended heatmaps to calculate the angle of the object of interest. In some embodiments, information about lines may be extracted from the blended heatmaps or segment heatmaps to calculate the angle of the object of interest. In some embodiments, information about key points, may be extracted from the blended heatmaps or key point heatmaps to calculate the angle of the object of interest. In some embodiments, the angle can be calculated using a key point method or a line method or a combination of the two methods.

Usually, the key point method comprises extracting information about key points from the blended heatmaps or key point heatmaps. In some embodiments, the key point method comprises determining the coordinates of the key points from the blended heatmaps. In some embodiments, the key point method comprises determining the coordinates of the key points from the key point heatmaps. In some embodiments, the extraction of information about the key points can be performed by a number of methods, including but not limited to non-maximum suppression, blob detection, or heatmap sampling, or a combination thereof. In some embodiments, heatmap sampling comprises sampling coordinates in the blended heatmaps with the highest intensity. In some embodiments, the coordinates with the highest intensity may be selected based on an assumption that only one subject is present in the input data. In some embodiments, the coordinates with the highest intensity may be selected based on an assumption that only one object of interest for angle determination is present in the input data. In some embodiments, the three heatmaps A, B and C, similar to those shown in FIG. 5, may be used to determine coordinates of the three key points (A, B and C), similar to those shown in FIGS. 4 and 5. In some embodiments, the angle of the object of interest may be calculated as the angle formed by three key points, similar to the key points A, B and C as shown in FIG. 4.

Usually, the line method, also referred herein as the segment method, comprises extract information about segments from the blended heatmaps or segment heatmaps or a combination thereof. In some embodiments, the line method comprises determining the coordinates of the segments from the blended heatmaps or segment heatmaps or a combination thereof. In some embodiments, the line method comprises determining the coordinates of the segments from the blended heatmaps. In some embodiments, the line method comprises determining the coordinates of the segments from the segment heatmaps. In some embodiments, where the line method is used with segment heatmaps, the blending step may be omitted. In some embodiments, the extraction of information about the segments can be performed by a number of methods, including but not limited to non-maximum suppression, blob detection, heatmap sampling, or line detection methods, or a combination thereof. In some embodiments, heatmap sampling comprises sampling coordinates in the blended heatmaps with the highest intensity. In some embodiments, the coordinates with the highest intensity may be selected based on an assumption that only one subject is present in the input data. In some embodiments, the line detection method may be used to determine the line parameters. In some embodiments, the line detection method comprises Hough transform. In some embodiments, the input data of the image or the video may be binarized. In some embodiments, preprocessing techniques such as erosion or dilation may be used on the input data of the image or the video to enhance the accuracy of line detection. In some embodiments, the angle of the object of interest may be calculated based on two line segments as shown in FIG. 4. In some embodiments, the angle of the object of interest may be calculated based on two or more line segments.

In some embodiments, at least two segment heatmaps, each corresponding to a long bone near a joint, may be used to extract at least two lines corresponding to the long bones around the joint. In some embodiments, two segment heatmaps, which correspond to the two long bones meeting at a joint, may be used to extract two lines corresponding to the first bone and the second bone sharing the same joint. In some embodiments, segment heatmaps 4 and 5, which correspond to the upper and the lower legs or femur and tibia in FIG. 5, may be used to extract two lines corresponding to the first bone and the second bone sharing the same joint (femur and tibia for a knee).

Figure 6:
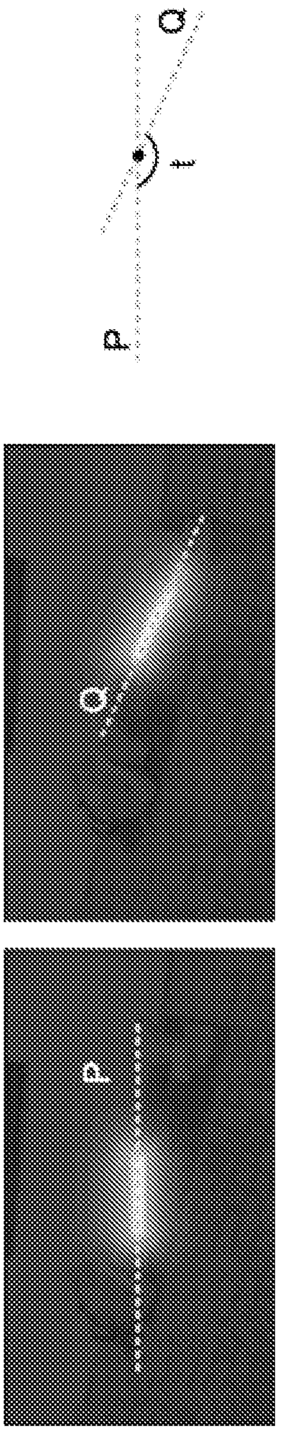
FIG. 6 shows an exemplary embodiment detecting lines (shown as dotted lines P and Q) from the segment heatmaps (left and middle panels) and calculating joint angle (t) (right panel).

In some embodiments, at least two blended heatmaps, comprising information about long bones of a joint, are used to extract at least two lines corresponding to the long bones of a joint. In some embodiments, two blended heatmaps, comprising information about two long bones of a joint, are used to extract two lines corresponding to the first bone and the second bone sharing the same joint. In some embodiments, blended heatmaps A and C, as shown in FIG. 5 are used to extract two lines corresponding to the first bone and the second bone sharing the same joint (femur and tibia in knee case). FIG. 6 shows an exemplary embodiment detecting lines (shown as dotted lines P and Q) from the segment heatmaps (left and middle panels) and calculating joint angle (t) (right panel).

Determining Joint Angles Under Occlusion

The methods and systems described herein may have the capability to determine angles of the object of interest with or without occlusion in the input data. Often, general purpose systems such as OpenPose may have difficulty generating useful results when strong occlusion is present in the input data.

Figure 7:
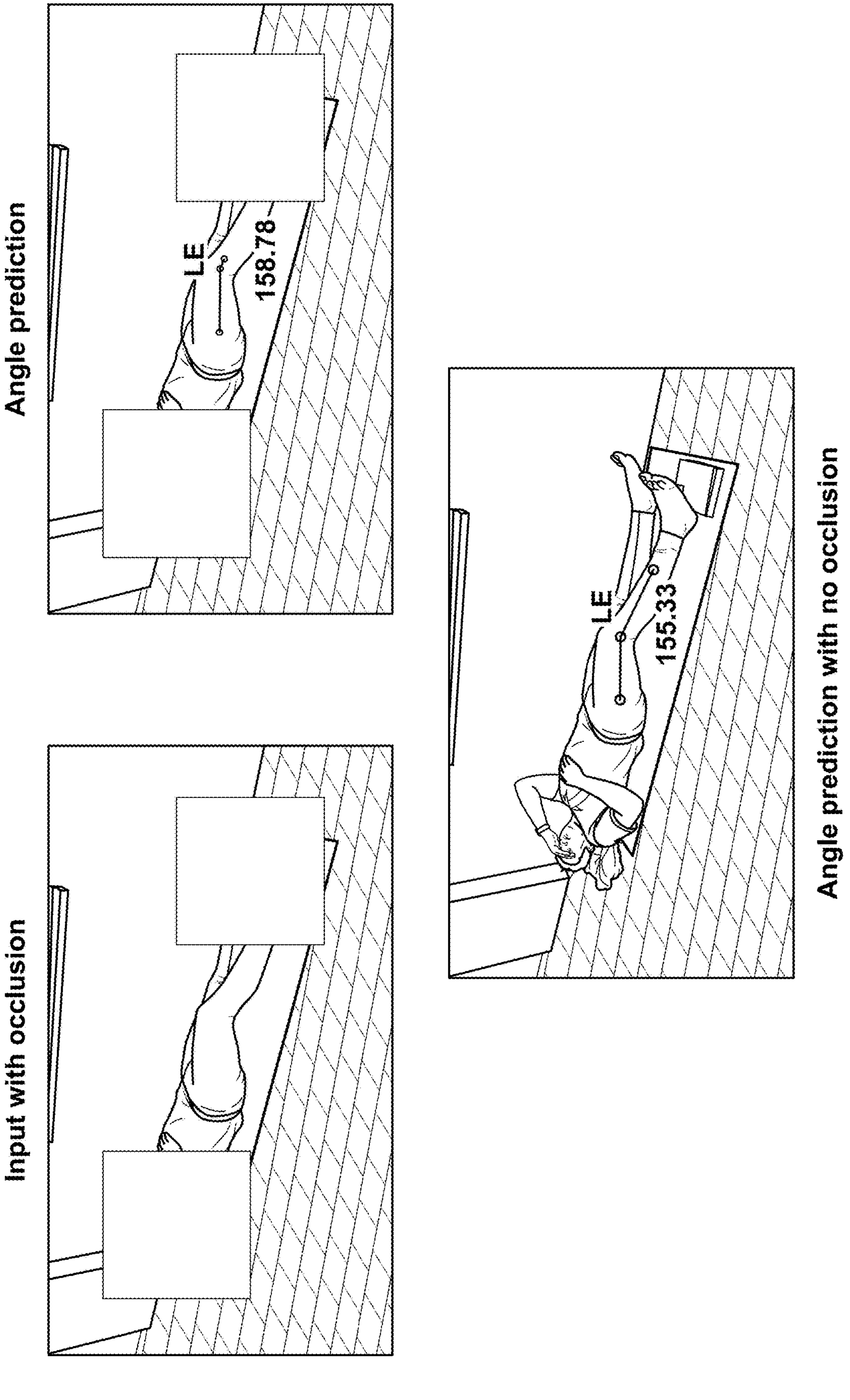
FIG. 7 show an exemplary embodiment predicting joint angle from an input image with a strong occlusion, as indicated by a white box, covering the ankle joint and lower tibia area, (top row) and from an input image with no occlusion (bottom row).
Figure 8:
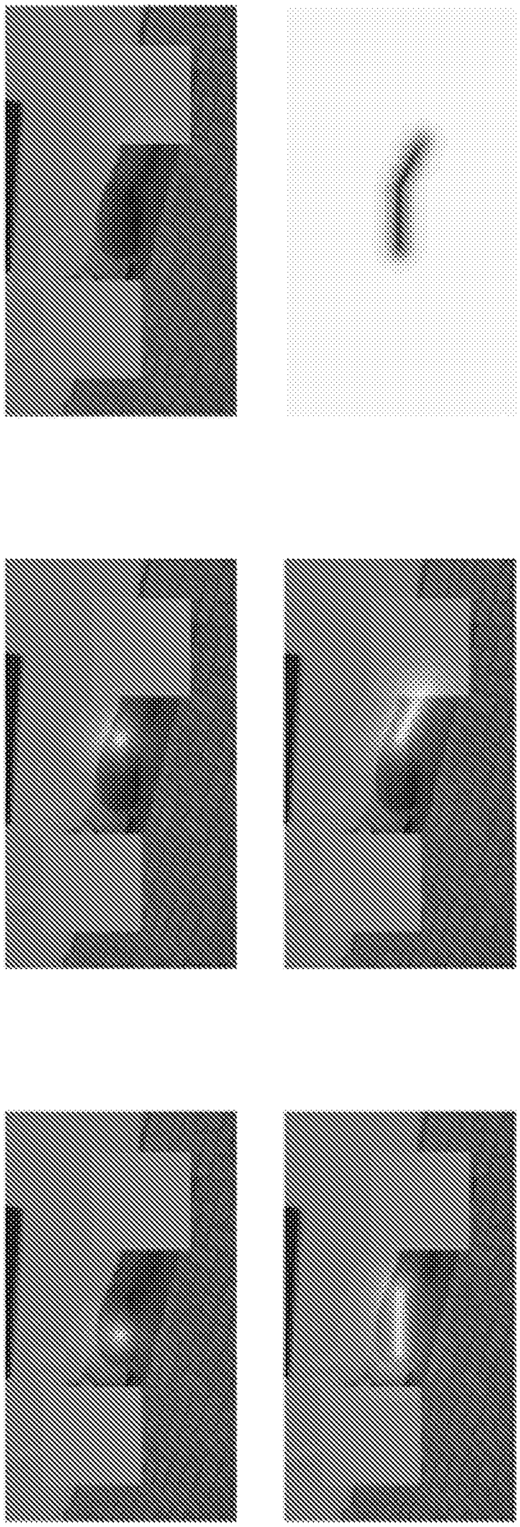
FIG. 8 shows an exemplary embodiment predicted key point heatmaps (top row), predicted segment heatmaps (bottom left and bottom middle), and a predicted combined heatmap (bottom right) from an input image with a strong occlusion as indicated by a white box, covering the ankle joint and lower tibia area. Even though the key point for the ankle was not detected in the key point heatmap for the lower tibia area (top right), the methods and systems provided herein is able to generate the combined heatmap to provide a joint angle.

FIG. 7 and FIG. 8 provide examples of how the methods and systems described herein may work under strong occlusion in the input data. FIG. 7 show an exemplary embodiment predicting joint angle from an input image with a strong occlusion, as indicated by a white box, covering the ankle joint and lower leg area, (top row) and from an input image with no occlusion (bottom row). FIG. 8 shows an exemplary embodiment predicted key point heatmaps (top row), predicted segment heatmaps (bottom left and bottom middle), and a predicted combined heatmap (bottom right) from an input image with a strong occlusion as indicated by a white box, covering the ankle joint and lower leg area. In some embodiments, a combined heatmap refers to a blended heatmap. Even though the key point for the lower leg was not detected in the key point heatmap for the lower leg (top right), the methods and systems provided herein is able to generate the combined heatmap to provide a joint angle. In some embodiments, the neural network fails to detect at least one key point on at least one of the long bones of the joint due to occlusion of the at least one of the long bones. In some embodiments, the neural network fails to detect a key point on one of the long bones of the joint due to occlusion of the same long bones. In some embodiments, the neural network fails to detect a key point on the lower leg (tibia) due to occlusion of the lower leg. In some embodiments, the neural network fails to detect a key point on the upper leg (femur) due to occlusion of the upper leg. In some embodiments, the segment heatmaps, which detects the lower and upper parts of the leg, allows for deduction of the angle of the knee using techniques mentioned above. In some embodiments, joint angle predicted under occlusion is different from the fully visible results by at most 1 degree, 1 degree, 2 degrees, 3 degrees, 4 degrees, 5 degrees, 6 degrees, 7 degrees, 8 degrees, 9 degrees, 10 degrees, 15 degrees, or 20 degrees. In some embodiments, joint angle predicted under occlusion is different from the fully visible results by about 1 degree, 1 degree, 2 degrees, 3 degrees, 4 degrees, 5 degrees, 6 degrees, 7 degrees, 8 degrees, 9 degrees, or 10 degrees. In some embodiments, joint angle predicted under occlusion is just 2.5 degrees off from the fully visible results (FIG. 7).

Figure 10:
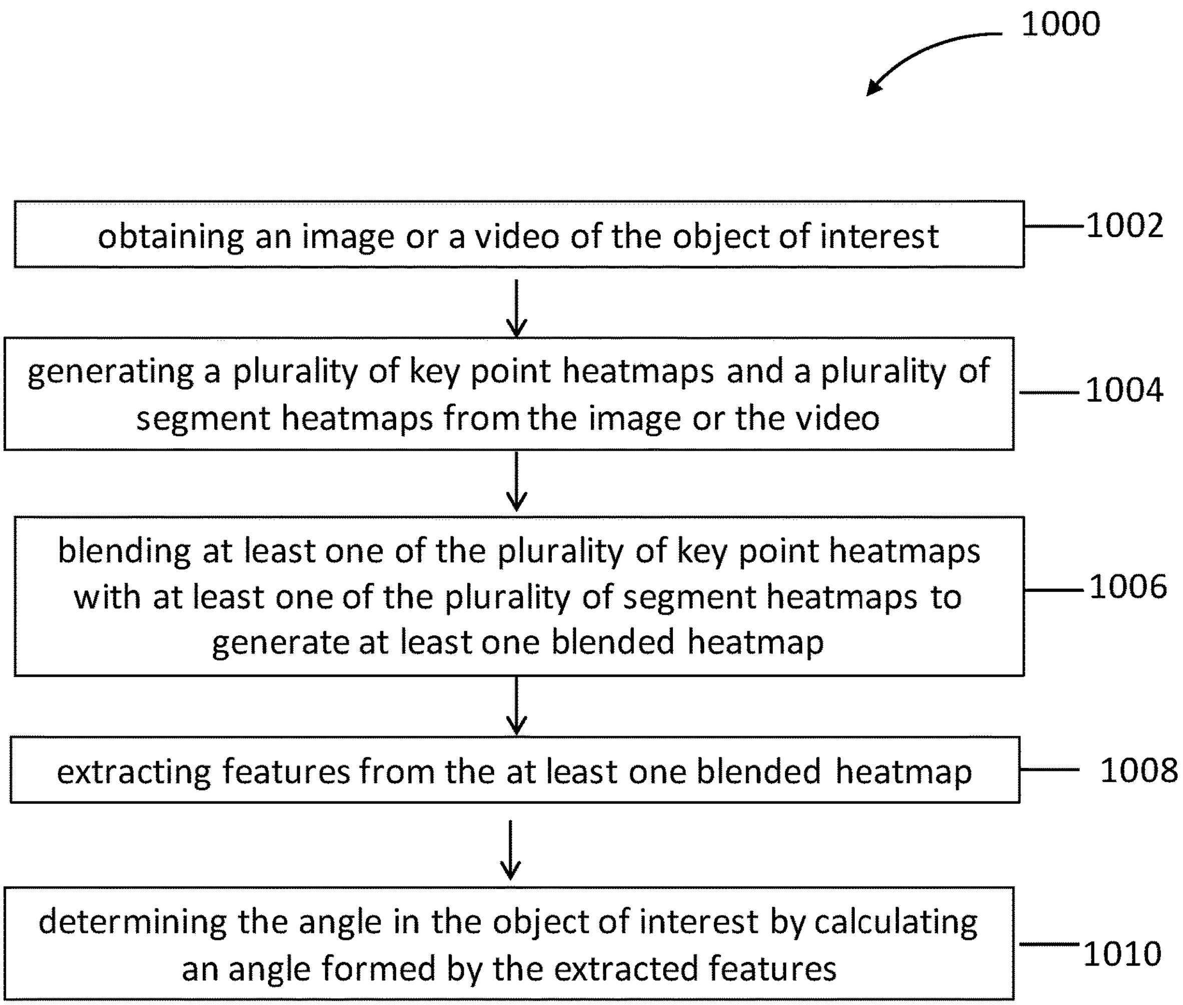
FIG. 10 shows an exemplary embodiment of methods for determining joint angle from an image.

FIG. 10 shows an exemplary embodiment of a method 1000 for determining joint angle from an image. In step 1002, an image or a video of the object of interest is obtained by the system. In step 1004, a plurality of key point heatmaps and a plurality of segment heatmaps are generated from the image or the video. In step 1006, at least one of the plurality of key point heatmaps with at least one of the plurality of segment heatmaps are blended to generate at least one blended heatmap. In step 1008, features from the at least one blended heatmap are extracted. In some embodiments, the features are key points or segments or a combination thereof. In step 1010, the angle in the object of interest is determined by calculating an angle formed by the extracted features.

In some embodiments, the object of interest comprises a joint of a subject. In some embodiments, the joint comprises an articulating joint. In some embodiments, the joint comprises at least one of a knee joint, a hip joint, an ankle joint, a hand joint, an elbow joint, a wrist joint, a finger joint, an axillary articulation, a stemoclavicular joint, a vertebral articulation, a temporomandibular joint, and articulations of a foot. In some embodiments, the joint comprises at least one of joint of a shoulder, elbow, hip, knee, or ankle. In some embodiments, the knee joint comprises a femur and a tibia. In some embodiments, the knee joint comprises a lateral epicondyle of the femur, a medial epicondyle of the femur, a lateral epicondyle of the tibia, and a medial epicondyle of the tibia. In some embodiments, the lateral epicondyle of the femur is the key point used as the vertex for the knee joint angle. In some embodiments, the medial epicondyle of the femur is the key point used as the vertex for the knee joint angle. In some embodiments, the lateral epicondyle of the tibia is the key point used as the vertex for the knee joint angle. In some embodiments, the medial epicondyle of the tibia is the key point used as the vertex for the knee joint angle. In some embodiments, the ankle joint comprises a lateral malleolus and a medial malleolus. In some embodiments, the lateral malleolus is the key point used as the vertex of the ankle joint angle. In some embodiments, the medial malleolus is the key point used as the vertex of the ankle joint angle. In some embodiments, the hip joint comprises the greater trochanter of the femur. In some embodiments, the greater trochanter is the key point used as the vertex of the hip joint angle.

In some embodiments, the methods and systems provided herein provides guidance or recommendation on diagnosis, prognosis, physical therapy, surgical procedure, or rehabilitation. In some cases, the rehabilitation is post-surgical procedure. In some cases, the rehabilitation is post-procedure that is minimally invasive. In some embodiments, the subject is healthy. In some embodiments, the subject is suspected of having a condition or a disease. In some embodiments, the subject has been diagnosed as having a condition or a disease. In some embodiments, the condition or disease comprises osteoarthritis, rheumatoid arthritis, arthritis, tendinitis, gout, bursitis, dislocation, ligament or tendon tear, joint sprains, or lupus. In some embodiments, the condition or disease comprises joint stiffness, decreased joint mobility, decreased joint function, joint inflammation, joint pain, bone pain, or pain during movement. In some embodiments, the surgical includes but is not limited to osteotomy, joint arthroplasty, total joint replacement, partial joint replacement, joint resurfacing, joint reconstruction, joint arthroscopy, joint replacement revision, meniscectomy, repair of a bone fracture, tissue grafting, and laminectomy. In some embodiments, the surgical procedure comprises repair of a ligament in a joint. In some embodiments, the surgical procedure comprises anterior cruciate ligament (ACL) or posterior cruciate ligament (PCL) repair. In some embodiments, the surgical procedure comprises a knee or a hip replacement.

In some embodiments, the guidance provided by the methods and systems provided herein improves the patient outcome. In some embodiments, the patient outcome comprises reduction in pain score. In some embodiments, the patient outcome comprises an increase in range of mobility, which may be measured in degrees. In some embodiments, the use of the methods and systems provided herein improves the patient outcome by at least about 1%, 2%, 3%, 4%, 5%, 6%, 7%, 8%, 9%, 10%, 15%, 20%, 25%, 30%, 35%, 40%, 45%, or 50% as compared with not using the methods and systems provided herein. In some embodiments, the use of the methods and systems provided herein improves the range of motion by at least about 1%, 2%, 3%, 4%, 5%, 6%, 7%, 8%, 9%, 10%, 15%, 20%, 25%, 30%, 35%, 40%, 45%, or 50% as compared with not using the methods and systems provided herein. In some embodiments, the use of the methods and systems provided herein improves the range of motion by at least about 1 degree, 2 degrees, 3 degrees, 4 degrees, 5 degrees, 6 degrees, 7 degrees, 8 degrees, 9 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or 90 degrees as compared with not using the methods and systems provided herein. In some embodiments, the use of the methods and systems provided herein improves the range of motion by at most about 1 degree, 2 degrees, 3 degrees, 4 degrees, 5 degrees, 6 degrees, 7 degrees, 8 degrees, 9 degrees, 10 degrees, 15 degrees, 20 degrees, 25 degrees, 30 degrees, 35 degrees, 40 degrees, 45 degrees, 50 degrees, 55 degrees, 60 degrees, 65 degrees, 70 degrees, 75 degrees, 80 degrees, 85 degrees, or 90 degrees as compared with not using the methods and systems provided herein.

In some embodiments, the methods provided herein are repeated during a set time period to obtain information on angles of the object of interest during the set time. In some embodiments, the methods described herein provide a real-time or near real-time information on the angles of the object of interest during the set time period. In some embodiments, the methods described herein provide a real-time or near real-time tracking of the object of interest and the angle of the object of interest during the set time period. In some embodiments, the methods provided herein are performed continuously during the set time.

The methods and systems provided herein may use an imaging module to capture an image of the object of interest. In some instances, the imaging module comprise a camera. In some instances, the imaging module comprises a standard area scan camera. In some embodiments, the camera is a monochrome area scan camera. In some embodiments, the imaging module comprises a CMOS sensor. In some instances, the imaging module is selected for its pixel size, resolution, and/or speed. In some instances, the imaging module captures the images or videos in compressed MPEG or uncompressed raw format. In some instances, the image comprises a data file in an image file format, including but not limited to JPEG, TIFF, or SVG. In some instances, the image or the video comprises a video file format, including but not limited to MPEG or raw video format. In some instances, the image comprises video frames.

In some instances, the imaging module is positioned and oriented to wholly capture the object of interest. In some instances, the images and videos are captured by a mobile device, which transfers the images and videos to a computer. In some instances, the image or video transfer to a computer occurs by an ethernet connection. In some instances, the image or video transfer to a computer occurs wirelessly, including but not limited to Wi-Fi or Bluetooth. In some instances, the power is supplied via Power-over-Ethernet protocol (PoE).

The neural network may be trained. In some embodiments, the neural network is trained with a training dataset. In some embodiments, a synthetic training dataset is used to train the neural network. In some embodiments, the neural network is trained with an experimental dataset or a real dataset. In some embodiments, data augmentation may be used to simulate real-world distortions and noises. In some embodiments, a training set comprising augmented data simulating distortion and noises is used to train the neural network. In some embodiments, the neural network is trained using automatic differentiation and adaptive optimization.

In some embodiments, the methods and systems provided herein use a neural network. The design of the network may follow best practices such as interleaving convolution layers with max-pooling layers to simplify network complexity and improve robustness. In some embodiments, two convolution layers are followed by a max-pooling layer. In some embodiments, 1, 2, 3, 4, 5, 6, 7, 8, 9, or 10 convolution layers are followed by a max-pooling layer. In some embodiments, at least 1, 2, 3, 4, 5, 6, 7, 8, 9, or 10 convolution layers are followed by a max-pooling layer. In some embodiments, no more than 1, 2, 3, 4, 5, 6, 7, 8, 9, or 10 convolution layers are followed by a max-pooling layer. In some embodiments, each subsequent layer has a higher number of filters than previous layer to account for different characteristics of the data at different scales. In some embodiments, the number of filters increases by a factor of 2. In some embodiments, techniques including but not limited to dilational convolution, strided convolution, or depth-wise convocation may be used to further improve performance and latency.

In some embodiments, the methods and systems provided herein may be used to generate a representation of the object of interest and the angle determination on a display. In some embodiments, the methods and systems provided herein may be used to generate a three-dimensional visual representation of the object of interest and the angle determination on a display. In some embodiments, the visual representation may be manipulated by a user, such as rotating, zooming in, or moving the visual representation. In some embodiments, the visual representation may have recommendations on steps of the surgical procedure, diagnosis, prognosis, physical therapy, or rehabilitation.

Processor

The methods, devices, and systems provided herein comprises a processor to control and integrate the function of the various components to register, track, and/or guide the object of interest. Provided herein are computer-implemented systems comprising: a digital processing device comprising: at least one processor, an operating system configured to perform executable instructions, a memory, and a computer program. The methods, devices, and systems disclosed herein are performed using a computing platform. A computing platform may be equipped with user input and output features. A computing platform typically comprises known components such as a processor, an operating system, system memory, memory storage devices, input-output controllers, input-output devices, and display devices. In some instances, a computing platform comprises a non-transitory computer-readable medium having instructions or computer code thereon for performing various computer-implemented operations.

Figure 11:
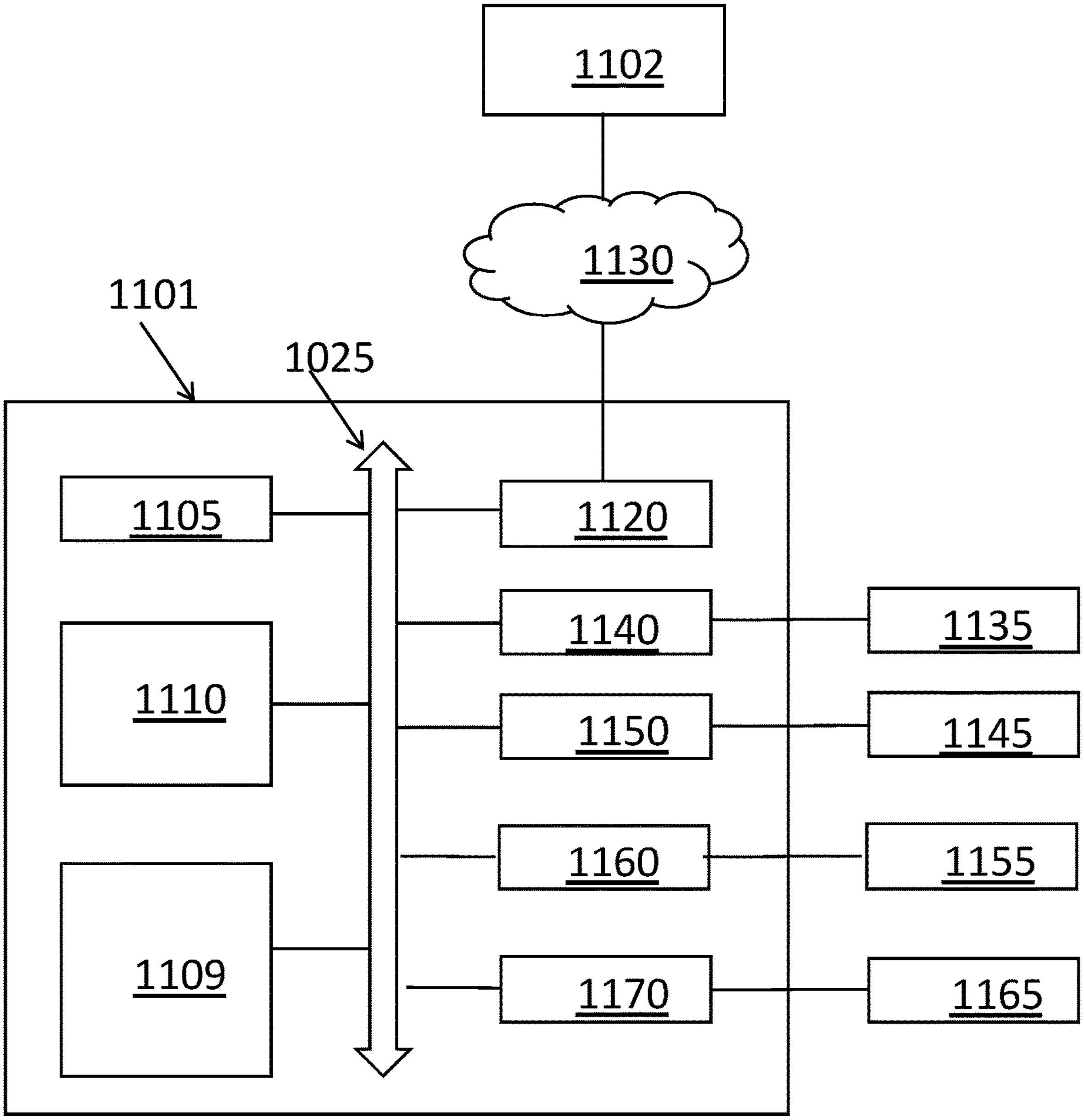
FIG. 11 shows an exemplary embodiment of systems as described herein comprising a device such as a digital processing device.

FIG. 11 shows an exemplary embodiment of a system as described herein comprising a device such as a digital processing device 1101. The digital processing device 1101 includes a software application configured to monitor the physical parameters of an individual. The digital processing device 1101 may include a processing unit 1105. In some embodiments, the processing unit may be a central processing unit ("CPU," also "processor" and "computer processor"

herein) having a single-core or multi-core processor, or a plurality of processors for parallel processing or a graphics processing unit ("GPU"). In some embodiments, the GPU is embedded in a CPU die. The digital processing device 1101 also includes either memory or a memory location 1110 (e.g., random-access memory, read-only memory, flash memory), electronic storage unit 1115 (e.g., hard disk), communication interface 1120 (e.g., network adapter, network interface) for communicating with one or more other systems, and peripheral devices, such as a cache. The peripheral devices can include storage device(s) or storage medium(s) 1165 which communicate with the rest of the device via a storage interface 1170. The memory 1110, storage unit 1115, interface 1120 and peripheral devices are configured to communicate with the CPU 1105 through a communication bus 1125, such as a motherboard. The digital processing device 1101 can be operatively coupled to a computer network ("network") 1130 with the aid of the communication interface 1120. The network 1130 can comprise the Internet. The network 1130 can be a telecommunication and/or data network.

The digital processing device 1101 includes input device (s) 1145 to receive information from a user, the input device(s) in communication with other elements of the device via an input interface 1150. The digital processing device 1101 can include output device(s) 1155 that communicates to other elements of the device via an output interface 1160.

The CPU 1105 is configured to execute machine-readable instructions embodied in a software application or module. The instructions may be stored in a memory location, such as the memory 1110. The memory 1110 may include various components (e.g., machine readable media) including, by way of non-limiting examples, a random-access memory ("RAM") component (e.g., a static RAM "SRAM", a dynamic RAM "DRAM, etc.), or a read-only (ROM) component. The memory 1110 can also include a basic input/output system (BIOS), including basic routines that help to transfer information between elements within the digital processing device, such as during device start-up, may be stored in the memory 1110.

The storage unit 1115 can be configured to store files, such as image files and parameter data. The storage unit 1115 can also be used to store operating system, application programs, and the like. Optionally, storage unit 1115 may be removably interfaced with the digital processing device (e.g., via an external port connector (not shown)) and/or via a storage unit interface. Software may reside, completely or partially, within a computer-readable storage medium within or outside of the storage unit 1115. In another example, software may reside, completely or partially, within processor(s) 1105.

Information and data can be displayed to a user through a display 1135. The display is connected to the bus 1125 via an interface 1140, and transport of data between the display other elements of the device 1101 can be controlled via the interface 1140.

Methods as described herein can be implemented by way of machine (e.g., computer processor) executable code stored on an electronic storage location of the digital processing device 1101, such as, for example, on the memory 1110 or electronic storage unit 1115. The machine executable or machine-readable code can be provided in the form of a software application or software module. During use, the code can be executed by the processor 1105. In some cases, the code can be retrieved from the storage unit 1115 and stored on the memory 1110 for ready access by the processor 1105. In some situations, the electronic storage unit 1115 can be precluded, and machine-executable instructions are stored on memory 1110.

In some embodiments, a remote device 1102 is configured to communicate with the digital processing device 1101, and may comprise any mobile computing device, non-limiting examples of which include a tablet computer, laptop computer, smartphone, or smartwatch. For example, in some embodiments, the remote device 1102 is a smartphone of the user that is configured to receive information from the digital processing device 1101 of the device or system described herein in which the information can include a summary, sensor data, or other data. In some embodiments, the remote device 1102 is a server on the network configured to send and/or receive data from the device or system described herein.

Definitions

Unless defined otherwise, all terms of art, notations and other technical and scientific terms or terminology used herein are intended to have the same meaning as is commonly understood by one of ordinary skill in the art to which the claimed subject matter pertains. In some cases, terms with commonly understood meanings are defined herein for clarity and/or for ready reference, and the inclusion of such definitions herein should not necessarily be construed to represent a substantial difference over what is generally understood in the art.

In the present description, any percentage range, ratio range, or integer range is to be understood to include the value of any integer within the recited range and, when appropriate, fractions thereof (such as one tenth and one hundredth of an integer), unless otherwise indicated. Throughout this application, various embodiments may be presented in a range format. It should be understood that the description in range format is merely for convenience and brevity and should not be construed as an inflexible limitation on the scope of the disclosure. Accordingly, the description of a range should be considered to have specifically disclosed all the possible subranges as well as individual numerical values within that range. For example, description of a range such as from 1 to 6 should be considered to have specifically disclosed subranges such as from 1 to 3, from 1 to 4, from 1 to 5, from 2 to 4, from 2 to 6, from 3 to 6 etc., as well as individual numbers within that range, for example, 1, 2, 3, 4, 5, and 6. This applies regardless of the breadth of the range.

As used in the specification and claims, the singular forms "a", "an" and "the" include plural references unless the context clearly dictates otherwise. For example, the term "a sample" includes a plurality of samples, including mixtures thereof. The use of the alternative (e.g., "or") should be understood to mean either one, both, or any combination thereof of the alternatives. As used herein, the terms "include" and "comprise" are used synonymously.

The term "about" or "approximately" can mean within an acceptable error range for the particular value as determined by one of ordinary skill in the art, which will depend in part on how the value is measured or determined, e.g., the limitations of the measurement system. For example, "about" can mean plus or minus 10%, per the practice in the art. Alternatively, "about" can mean a range of plus or minus 20%, plus or minus 10%, plus or minus 5%, or plus or minus 1% of a given value. Where particular values are described in the application and claims, unless otherwise stated, the term "about" means within an acceptable error range for the particular value that should be assumed. Also, where ranges and/or subranges of values are provided, the ranges and/or subranges can include the endpoints of the ranges and/or subranges.

The terms "determining", "measuring", "evaluating", "assessing," and "analyzing" are often used interchangeably herein to refer to forms of measurement and include determining if an element is present or not (for example, detection). These terms can include quantitative, qualitative or quantitative and qualitative determinations. Assessing is alternatively relative or absolute.

The terms "subject," "individual," or "patient" are often used interchangeably herein. A "subject" can be an animal. The subject can be a mammal. The mammal can be a human. The subject may have a disease or a condition that can be treated by a surgical procedure. The subject may have a disease or a condition that can be diagnosed or prognosed. The subject may have a disease or a condition that can be treated by rehabilitation or physical therapy.

The term "in vivo" is used to describe an event that takes place in a subject's body.

The term "ex vivo" is used to describe an event that takes place outside of a subject's body. An "ex vivo" assay is not performed on a subject. Rather, it is performed upon a sample separate from a subject. An example of an "ex vivo" assay performed on a sample is an "in vitro" assay.

The section headings used herein are for organizational purposes only and are not to be construed as limiting the subject matter described.

EXAMPLES

The following examples are included for illustrative purposes only and are not intended to limit the scope of the invention.

Example 1: Joint Angle Determination

Provided herein is an exemplary embodiment of workflow for determining joint angle using a general purpose system such as OpenPose. A general purpose system may have difficulty to generating useful results when strong occlusion is present in the input data. A general purpose system may have so many parameters, over 100 million in some cases. This makes it very difficult to implement such a system on small mobile devices such as mobile phones, tablets and web apps efficiently due to storage and computational limitations. In addition, many pose estimation systems require complicated post-processing steps to convert raw machine learning predictions to joint angle.

Example 2: Joint Angle Determination

The system takes as an input a RGB image containing a human figure and outputs angle measurements of a selected joint. In the first processing step (step 1), a deep neural network is utilized to predict rough locations of the relevant body landmarks and segments, which are represented by a set of heatmaps. In step 2, the heatmaps are blended together to make them more robust against occlusion and other types of noise. In step 3, a fixed number of keypoints or lines are extracted from the heatmaps and are directly used to estimate joint angles.

While preferred embodiments of the present invention have been shown and described herein, it will be obvious to those skilled in the art that such embodiments are provided by way of example only. Numerous variations, changes, and substitutions will now occur to those skilled in the art without departing from the invention. It should be understood that various alternatives to the embodiments of the invention described herein may be employed in practicing the invention. It is intended that the following claims define the scope of the invention and that methods and structures within the scope of these claims and their equivalents be covered thereby.

The invention claimed is:

1. A computer-implemented method for determining an angle in an object of interest, the method comprising:

(a) obtaining an image or a video of the object of interest;

(b) generating a plurality of key point heatmaps and a plurality of segment heatmaps from the image or the video;

(c) blending at least one of the plurality of key point heatmaps with at least one of the plurality of segment heatmaps to generate at least one blended heatmap;

(d) extracting features from the at least one blended heatmap, wherein the extracted features comprise extracted segments, and wherein the extracted segments are extracted using a line detection method; and (e) determining the angle in the object of interest by calculating an angle formed by the extracted features, wherein the angle is formed by the extracted segments.

2. The method of claim 1, wherein the extracted features comprise key points extracted from the at least one blended heatmap, wherein the angle formed by the extracted key points is defined by at least two of the extracted segments, wherein the at least two of the extracted segments are formed by connecting the extracted key points.

3. The method of claim 1, wherein the extracted segments are extracted using Hough transform.

4. The method of claim 1, wherein the object of interest comprises a joint of a subject.

5. The method of claim 1, wherein generating the plurality of key point heatmaps and the plurality of segment heatmaps in step (b) uses a deep neural network.

6. The method of claim 5, wherein the deep neural network comprises a convolutional network.

7. The method of claim 1, wherein the plurality of key point heatmaps represents landmarks on the image or the video of the object of interest.

8. The method of claim 1, wherein the plurality of segment heatmaps represents segments along a body part adjacent to a joint.

9. The method of claim 7, wherein one of the extracted segments connects at least two of the landmarks along a body part adjacent to a joint.

10. The method of claim 5, wherein step (b) further comprises generating a combined negative heatmap from the image or the video for training the deep neural network.

11. The method of claim 1, wherein the at least one of the plurality of key point heatmaps that represents a key point spatially adjacent to a segment represented by the at least one of the plurality of segment heatmaps.

12. The method of claim 1, wherein the blending provides improved handling of a noisy heatmap or a missing heatmap.

13. The method of claim 2, wherein extracting the key points uses at least one of non-maximum suppression, blob detection, or heatmap sampling.

14. The method of claim 2, wherein extracting the key points comprises selecting coordinates with highest pixel intensity in the at least one blended heatmap.

15. The method of claim 2, wherein at least three key points are extracted.

16. A computer-based system for determining an angle in an object of interest, the system comprising:

(a) a processor;

(b) a non-transitory medium comprising a computer program configured to cause the processor to:

(i) obtain an image or a video of the object of interest and input the image or the video into a computer program;

(ii) generate, using the computer program, a plurality of key point heatmaps and a plurality of segment heatmaps from the image or the video;

(iii) blend, using the computer program, at least one of the plurality of key point heatmaps with at least one of the plurality of segment heatmaps to generate at least one blended heatmap;

(iv) extract, using the computer program, features from the at least one blended heatmap, wherein the extracted features comprise extracted segments, wherein the extracted segments are extracted using a line detection method; and (v) determine, using the computer program, the angle in the object of interest by calculating an angle formed by the extracted features, wherein the angle is formed by the extracted segments.

17. The system of claim 16, wherein the extracted features comprise key points extracted from the at least one blended heatmap, wherein the angle formed by the extracted key points is defined by at least two of the extracted segments, wherein the at least two of the extracted segments are formed by connecting the extracted key points.

18. The method of claim 7, wherein the landmarks comprise a joint and at least one body part adjacent to the joint.

19. The method of claim 1, further comprising generating an output comprising the angle in the object of interest.

20. The method of claim 1, wherein the blending comprises taking an average of pixel intensity at each corresponding coordinate of the at least one of the plurality of key point heatmaps and the at least one of the plurality of segment heatmaps.

* * * * *